United States Patent [19]

Shiratsuchi

[11] Patent Number: 4,814,860

[45] Date of Patent: Mar. 21, 1989

[54] TELEVISION PICTURE ZOOM SYSTEM HAVING CHROMA PHASE RESTORATION CIRCUIT

[75] Inventor: Shinichi Shiratsuchi, Yokohama, Japan

[73] Assignee: RCA Licensing Corporation, Princeton, N.J.

[21] Appl. No.: 145,027

[22] Filed: Jan. 19, 1988

[51] Int. Cl.⁴ .......................... H04N 9/74; H04N 9/64
[52] U.S. Cl. .................................................... 358/22
[58] Field of Search .......................................... 358/22

[56] References Cited

U.S. PATENT DOCUMENTS

| | | | |
|---|---|---|---|
| 4,134,128 | 1/1979 | Hurst | 358/160 |
| 4,204,227 | 5/1980 | Gurley | 358/22 |
| 4,220,965 | 9/1980 | Heitmann et al. | 358/22 |
| 4,689,660 | 8/1987 | Kashigi | 358/13 |
| 4,712,130 | 12/1987 | Casey | 358/183 |
| 4,727,411 | 2/1988 | Yamaguchi et al. | 358/22 |

Primary Examiner—John W. Shepperd
Attorney, Agent, or Firm—Eugene M. Whitacre; Paul J. Rasmussen; Eric P. Herrmann

[57] ABSTRACT

In a TV receiver having a zoom system, the chroma signal is vertically and horizontally expanded by repeating the successive lines and pixels. The polarity of the vertically and horizontally chroma signal is selectively inverted in a manner restoring the phase coherence in the output signal.

16 Claims, 14 Drawing Sheets

TELEVISION PICTURE ZOOM SYSTEM HAVING CHROMA PHASE RESTORATION CIRCUIT

This invention relates to a television receiver having a picture magnifying apparatus.

BACKGROUND

In a copending and commonly-assigned U.S. patent application of the same inventor (Shiratsuchi), Ser. No. 38,260, circuitry is disclosed for magnifying a video image in real time. The aforesaid Shiratsuchi patent application is incorporated herein by reference. In an embodiment disclosed therein, the magnification factor MF is varied between 1 and 2 in small increments (i.e., 1/256) to produce the illusion of a continuous zoom.

In the Shiratsuchi zoom system, digital samples representative of a composite video baseband signal CVBS are stored in a digital field memory. The portion of the original image that is to be magnified is first extended in the vertical direction by repeating selected horizontal lines as the signal is read out from the field memory. For example, for a 2-to-1 vertical expansion (i.e., MF=2), each original horizontal line in the magnified portion of the image is read out twice (i.e., $L_1$, $L_1$, $L_2$, $L_2$, $L_3$, $L_3$ and so on).

A Y/C separator coupled to receive the vertically-expanded output of the field memory separates the memory output into a luma signal component Y and a chroma signal component C. For a 2-to-1 vertical magnification, the luma and chroma signals Y and C have the following sequences:

$$Y = L_2 + L_1, L_2 + L_1, L_3 + L_2, L_3 + L_2 \ldots,$$

$$C = L_2 - L_1, L_2 - L_1, L_3 - L_2, L_3 - L_2 \ldots,$$

where $L_1$, $L_2$, $L_3$ ... represent successive horizontal lines of samples of a raster scanned image.

In an NTSC-type system, the color difference signal components (e.g., R-Y and B-Y) are modulated on a color subcarrier signal. The unmodulated frequency $F_{sc}$ (3.58 MHz) of the color subcarrier signal is established at an odd multiple (455) of one-half the horizontal line frequency $F_H$ (15,734 Hz) to minimize the visibility of the interference between the recovered luma and chroma signals Y and C. A few cycles (8 to 10) of the unmodulated color subcarrier signal (known as the color burst signal) are included in the composite video baseband signal CVBS during the back porch interval of the horizontal blanking signal to allow regeneration of the color subcarrier signal in the TV receiver. The regenerated color subcarrier signal is used in the TV receiver for demodulating the separated chroma signal C into the respective color difference signals, as is well known in the art.

Because the color subcarrier frequency $F_{sc}$ is selected to be an odd multiple of one-half horizontal line frequency $F_H$, the phase of the recovered color subcarrier signal changes by 180° on a line-to-line basis. This feature of the color subcarrier signal facilitates chroma decoding in the TV receiver.

However, when the original image is extended vertically and horizontally by respectively repeating the horizontal lines and pixels, the phase of the modulated color subcarrier signal (i.e., chroma signal C) is disturbed. This makes it difficult to decode the composite video baseband signal CVBS into the luma signal component Y and the two color difference signal components R-Y and B-Y.

SUMMARY OF THE INVENTION

In accordance with this invention, apparatus is disclosed for restoring the phase coherence of the vertically and horizontally expanded chroma signal C. The chroma phase restoration apparatus includes means for sensing repetition of the chroma signal and means for selectively inverting the polarity of the chroma signal.

Figure 7:
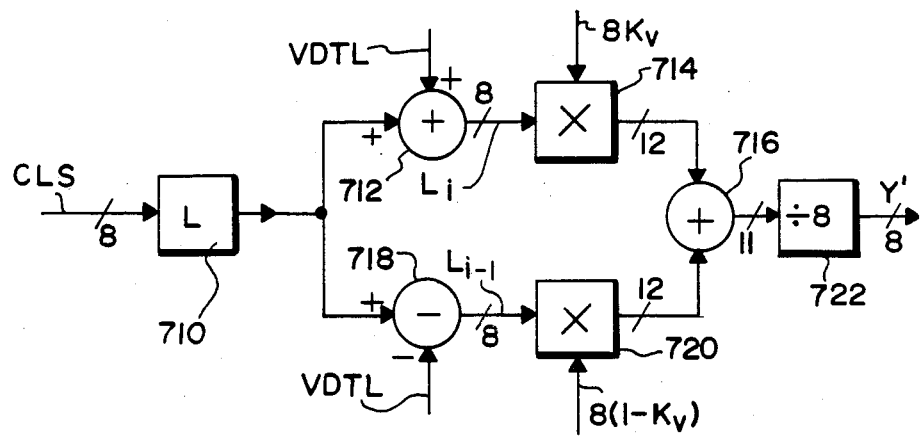
Figure 8:
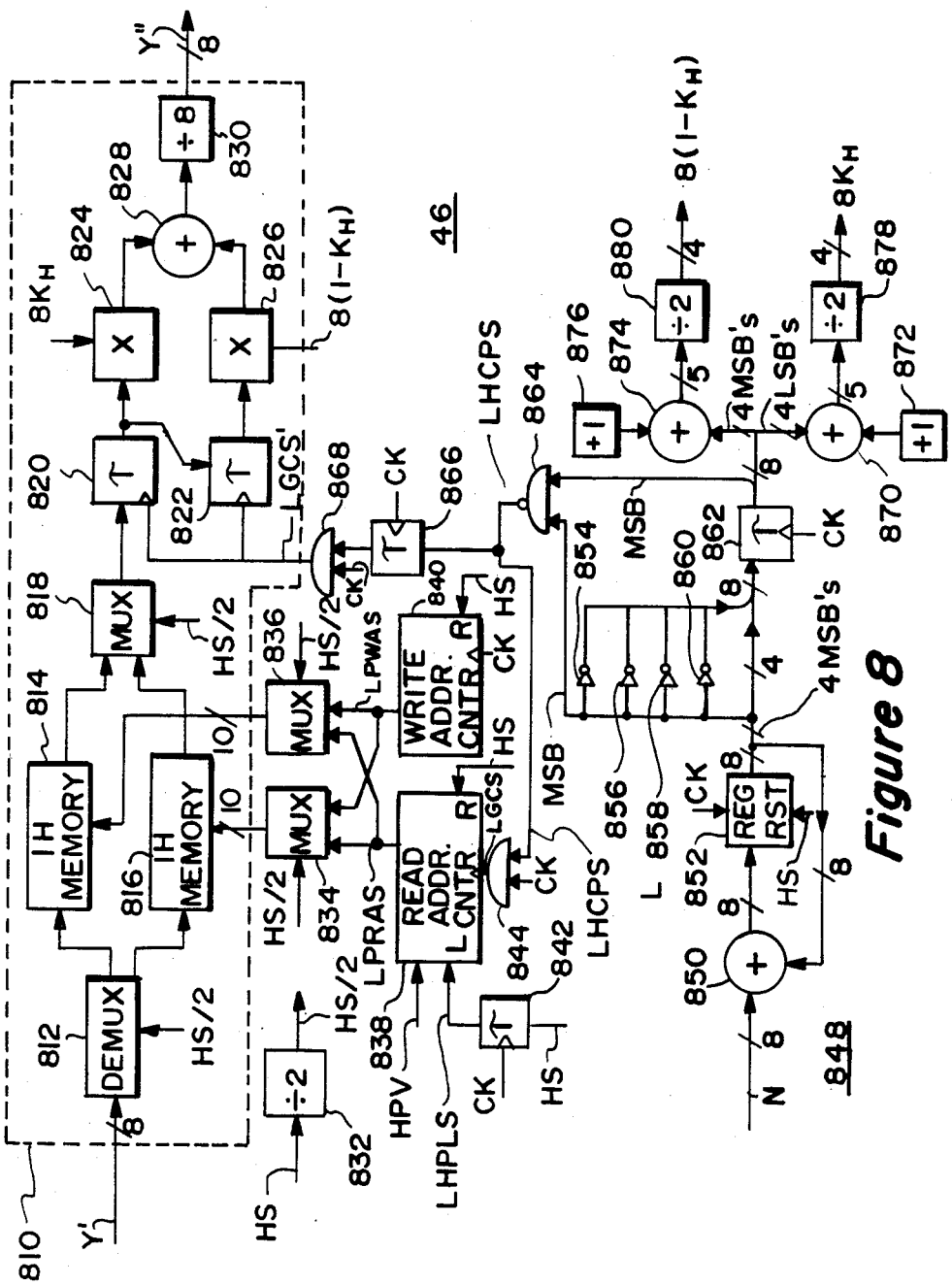
Figure 9:
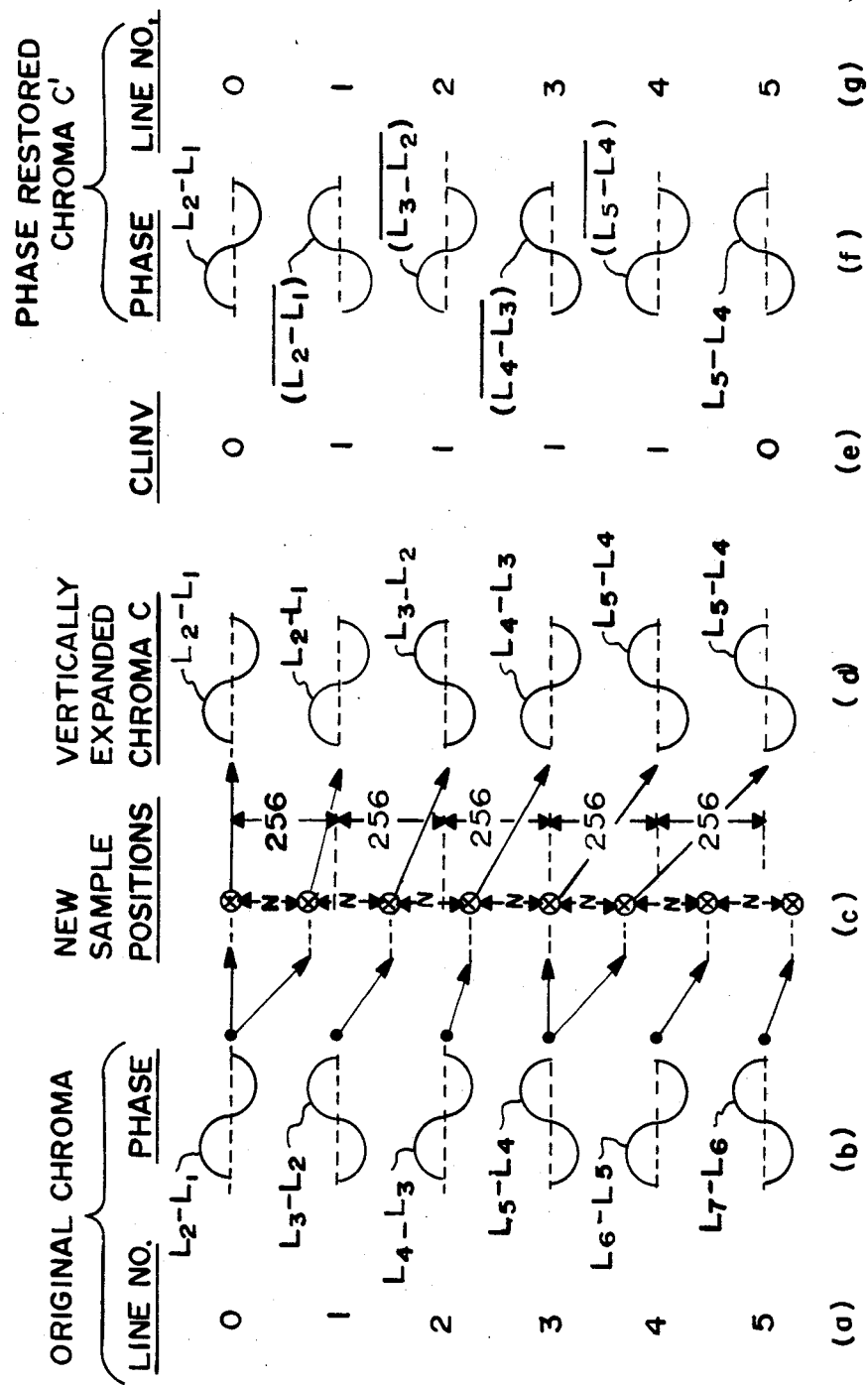
Figure 10:
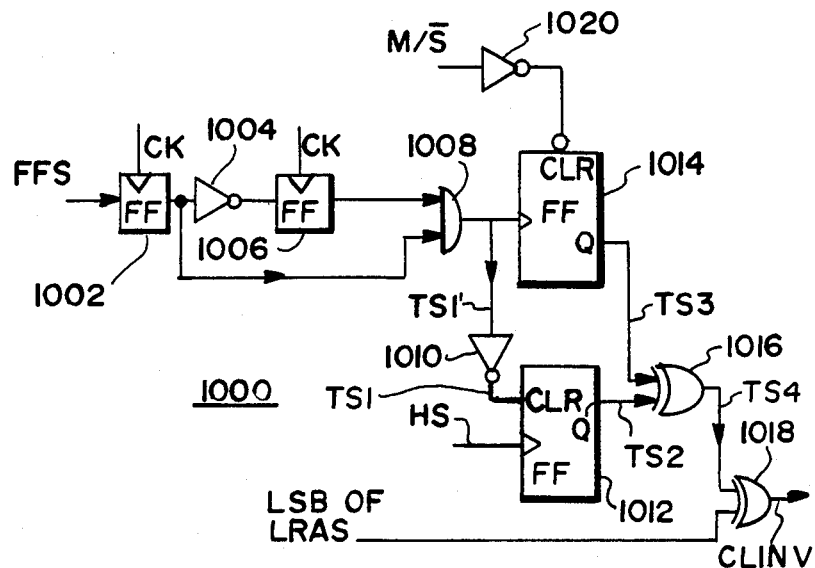
Figure 11:
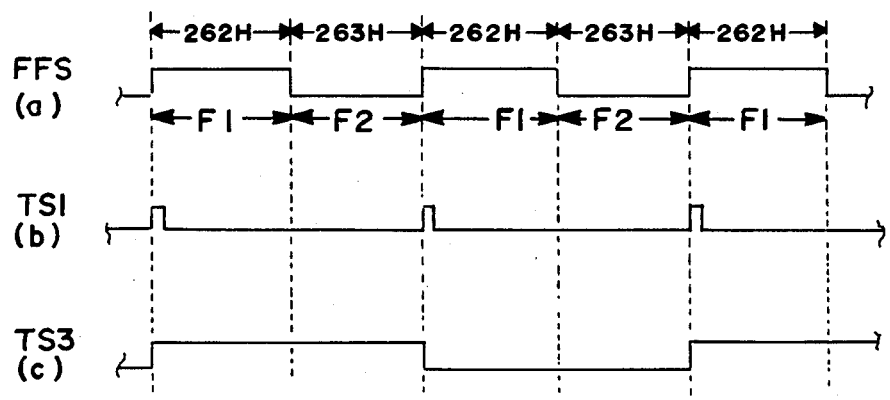
Figure 12:
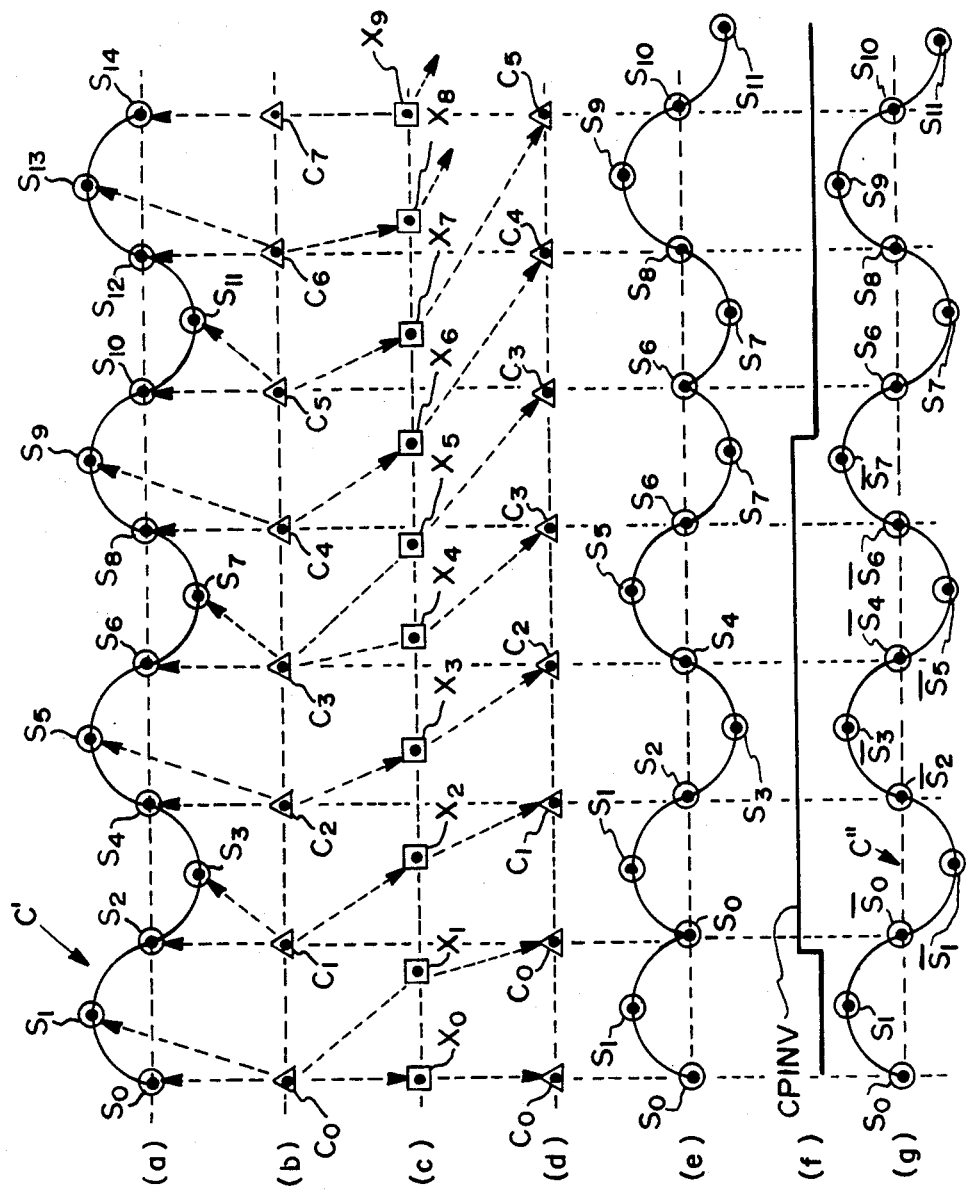
Figure 13:
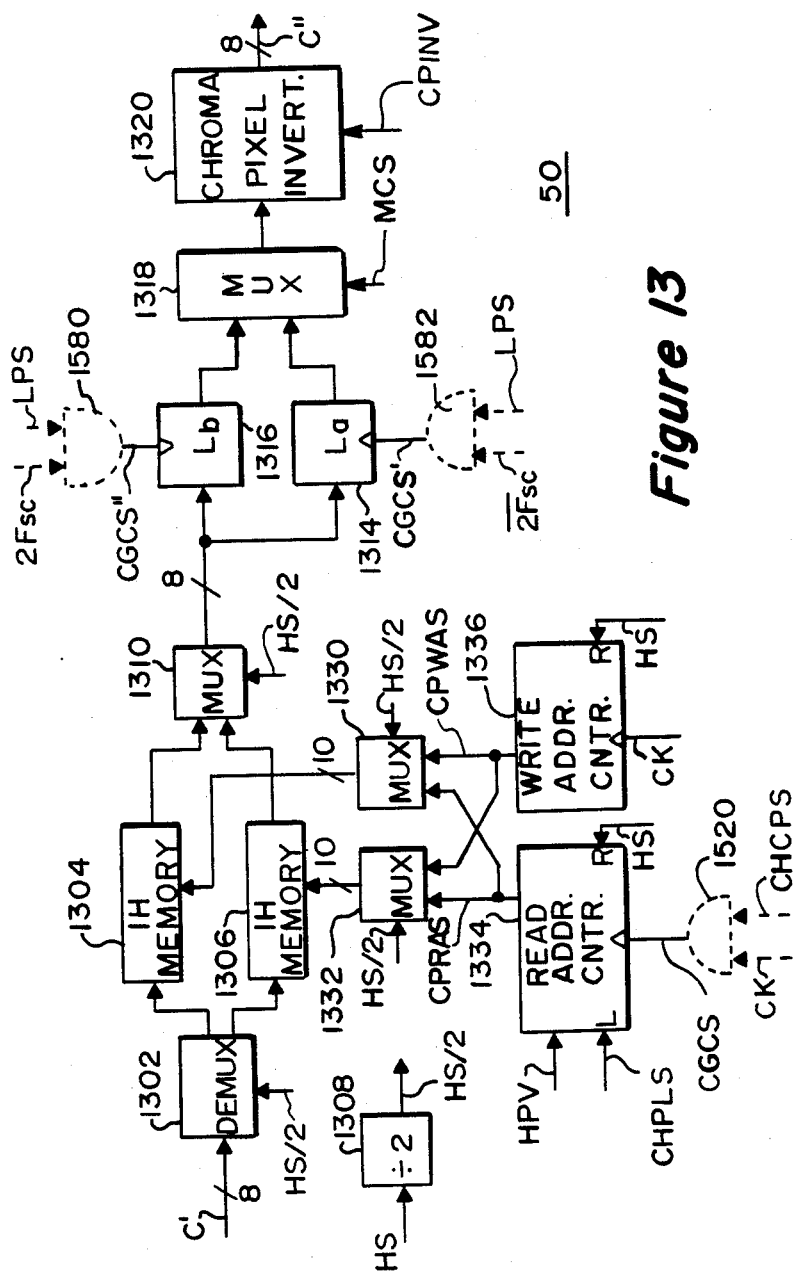
Figure 14:
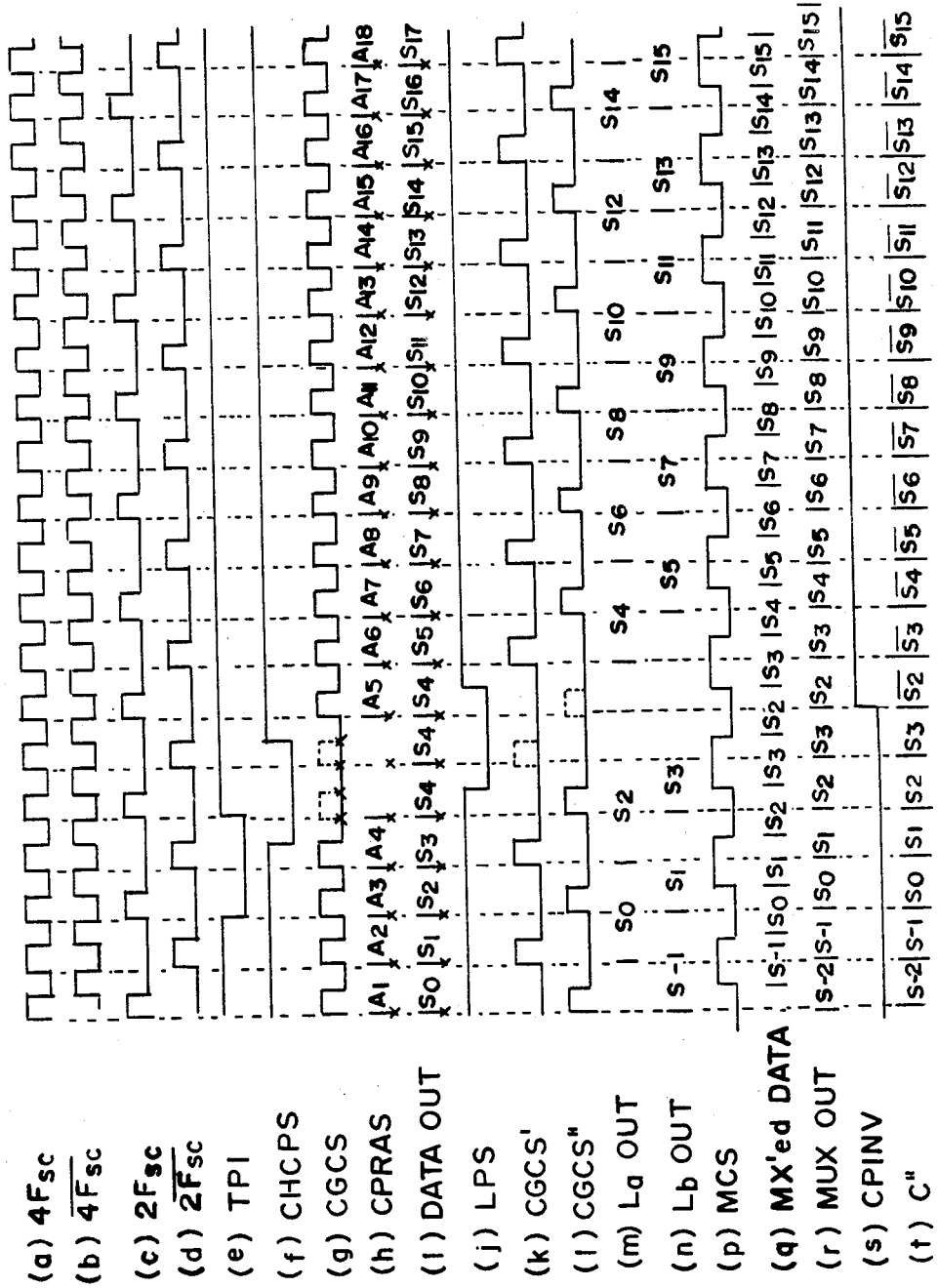
Figure 15:
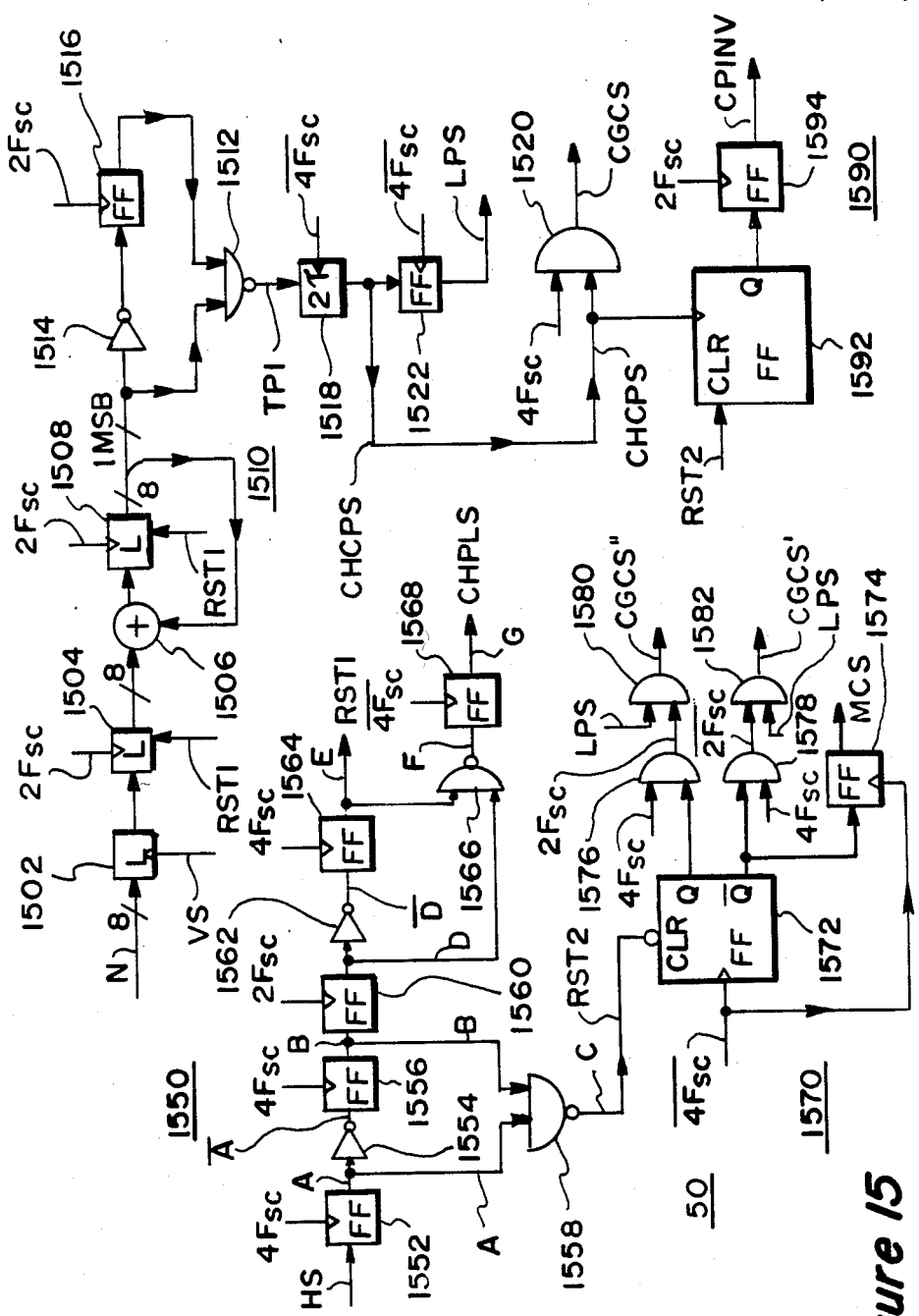
Figure 16:
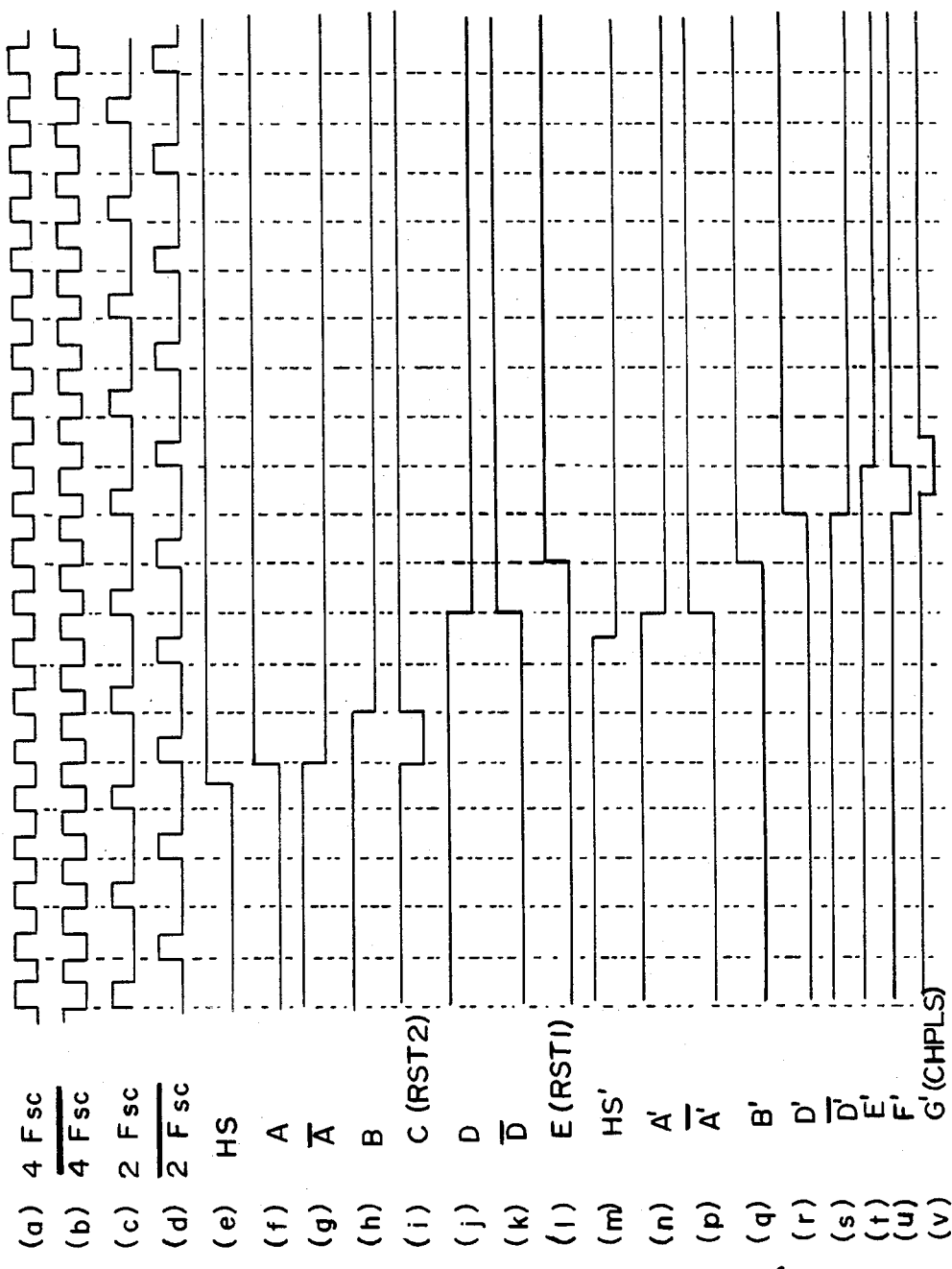

FIGS. 7 and 8 respectively represent the vertical and horizontal interpolators for generating luma samples for the magnified image;

FIG. 9 illustrates timing diagrams useful for understanding the operation of a chroma line inverter responsive to a chroma line invert signal CLINV;

FIG. 10 is a block diagram of a chroma line invert signal generating circuit;

FIG. 11 illusrates timing diagrams helpful for understanding the operation of the FIG. 10 circuit;

FIG. 12 shows timing diagrams useful for understanding the procedure for horizontally expanding the chroma signal, and for restoring the phase coherence of the horizontally-expanded chroma signal;

FIG. 13 shows a block diagram of the chroma horizontal expansion and inversion circuitry;

FIG. 14 represents timing diagrams helpful for understanding the operation of the FIG. 13 circuitry;

FIG. 15 depicts circuitry for generating the control signals used in the FIG. 13 circuitry; and FIG. 16 depicts timing diagrams useful for understanding the operation of the circuitry shown in FIG. 15.

DETAILED DESCRIPTION

In the DRAWINGS, the lines interconnecting various blocks represent either single conductor connections carrying analog signals or buses carrying binary digital signals, as the case may be. A value next to a slash mark intercepting a particular interconnecting line represents the number of parallel connections of that line or bus.

Depending on the processing speed of the devices used, compensating delays may be required in certain of the signal paths. One skilled in the art of digital video signal processing circuit design would know where such delays would be needed in a particular system.

Figure 1:
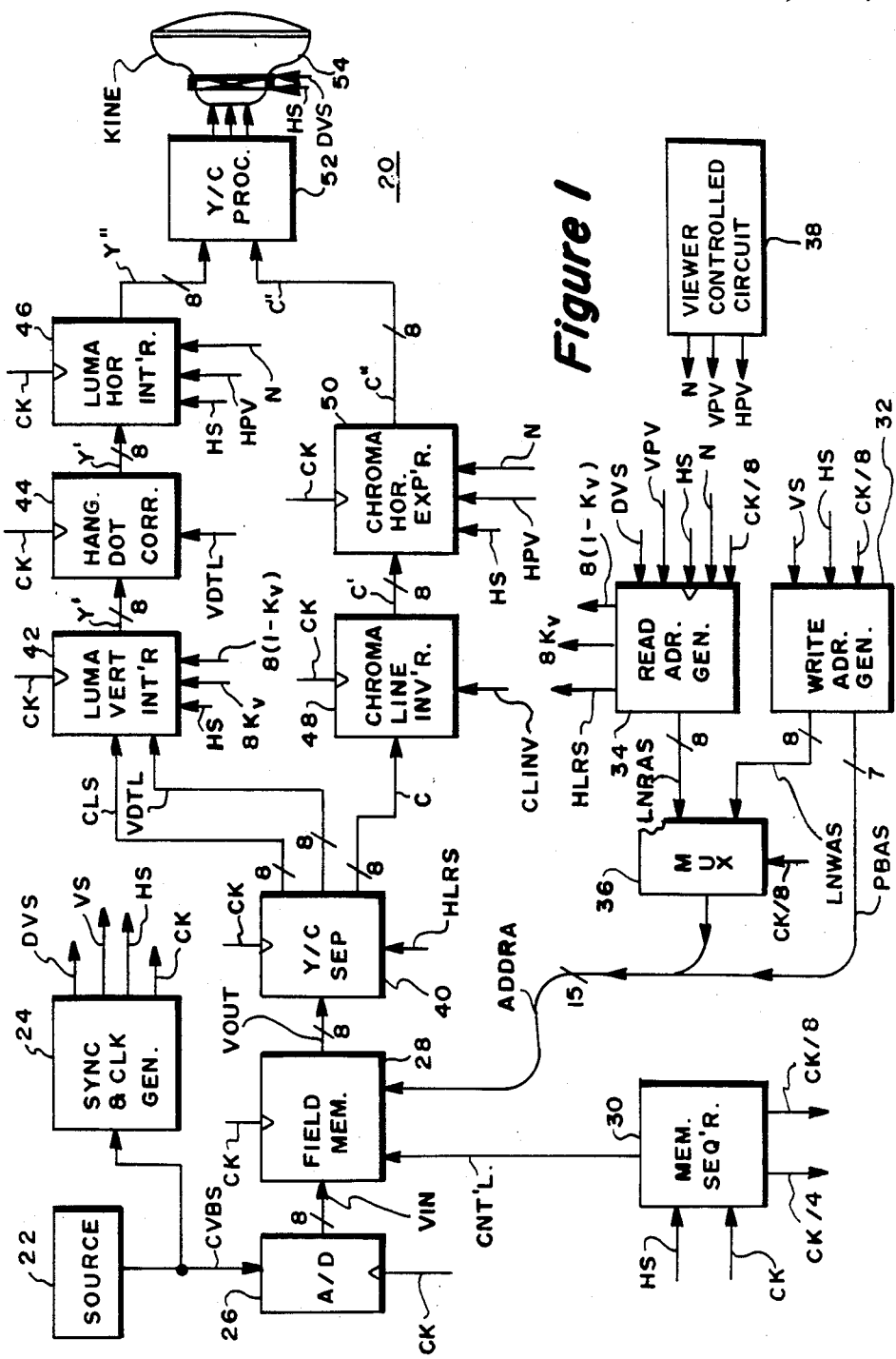
FIG. 1 is a block diagram showing a TV receiver having a zoom system incorporating the chroma phase inversion circuits in accordance with the principles of the present invention.

A TV receiver 20, depicted in FIG. 1, has a zoom system for magnifying video images in real time using 128 magnification factors MF varying approximately between 1 and 2 (i.e., 256/255, 256/254 ... 256/128).

When the magnification factor MF is 2, for example, a portion of the original image occupying one-quarter of the display screen may be enlarged to occupy the entire screen.

In FIG. 1, the numeral 22 represents a source of a composite video baseband signal CVBS. The source 22 may consist of a tuner, an IF amplifier and a video detector of a conventional TV receiver or a video cassette recorder (VCR). It is assumed for the purposes of description herein that the composite video baseband signal CVBS is in the NTSC format. In the NTSC format, the video signal consists of alternately occurring odd and even fields for producing an interlaced display on the TV screen. Each field, in turn, is made up of 262.5 successive horizontal lines of picture information representing a raster scanned video image, as is well known in the TV industry.

The composite video baseband signal CVBS is applied to a sync separator and a clock generator 24 and an analog-to-digital (A/D) converter 26. The circuit 24, which may be of conventional design, processes the composite video baseband signal CVBS to produce a horizontal sync signal HS and a vertical sync signal VS. In addition, the circuit 24 delays the signal VS by 128 horizontal line periods to produce a delayed vertical sync signal DVS. The deflection circuitry of the TV receiver 20, responsive to the horizontal sync signal HS and the delayed vertical sync signal DVS, produces a raster on the TV screen.

Furthermore, the circuit 24 includes a phase locked circuit (PLC) that develops a system clock signal CK that has (1) a frequency of four times the color subcarrier signal frequency $F_{sc}$ (i.e., $F_{ck}=4F_{sc}$), and (2) a phase that is locked to the phase of the color burst signal included in the composite video baseband signal CVBS.

The A/D converter 26 samples and digitizes the incoming composite video baseband signal CVBS at instants determined by the system clock signal CK. The digital samples from the A/D converter 26 are applied to the input port of a dual port field memory 28.

The field memory 28, stores the digital samples of the composite video baseband signal CVBS occurring at the 4 $F_{sc}$ clock rate in response to a write address signal WAS. Independently, the memory 28 simultaneously provides, at its output port, another stream of samples, also at the 4 $F_{sc}$ clock rate, in response to a read address signal RAS.

Figure 2:
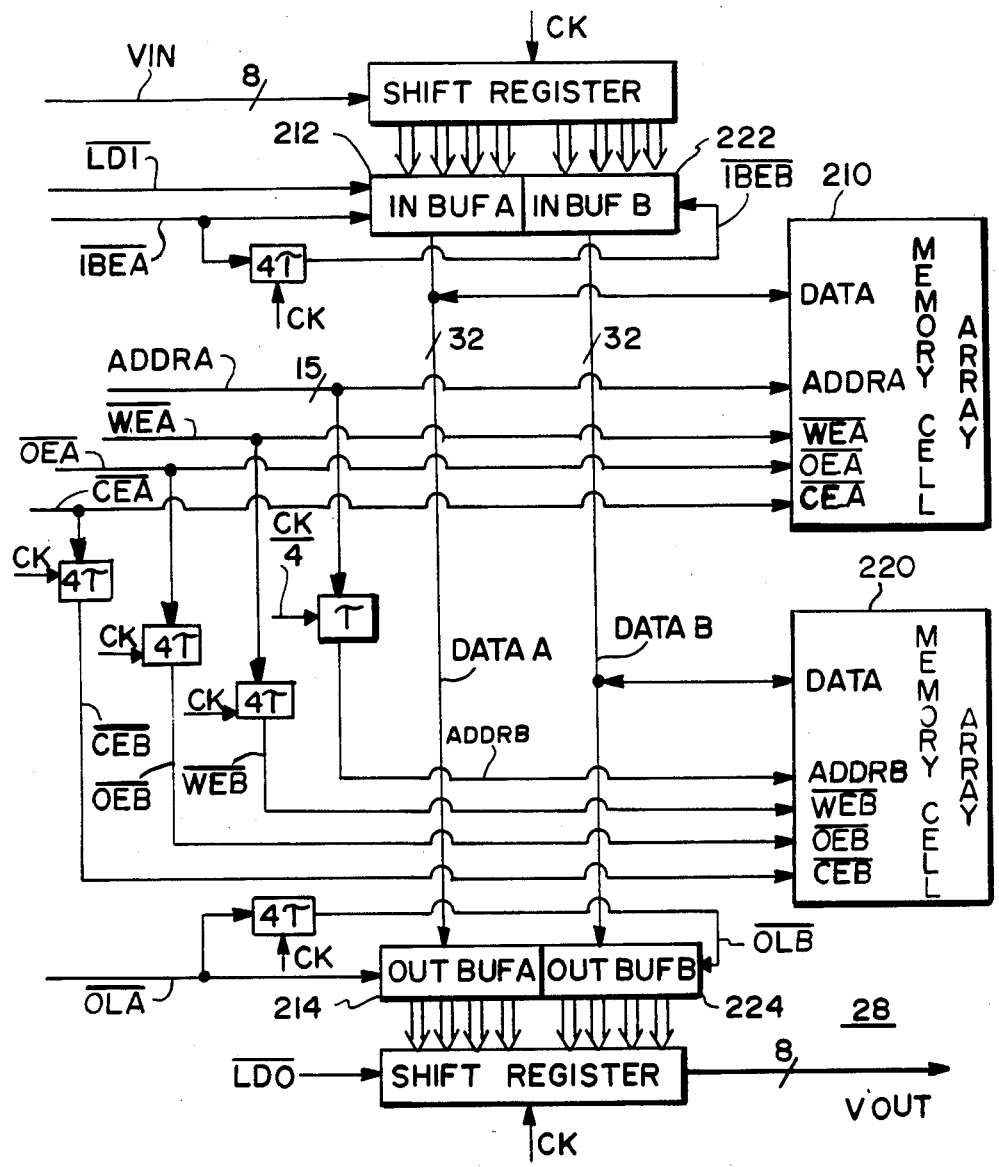
FIG. 2 is a block diagram of the circuitry including a field memory used for storing the incoming video signal in the FIG. 1 zoom system.

FIG. 2 is a block diagram of circuitry including the field memory 28. The 8-bit pixels provided by the A/D converter 26 are stored either in memory array 210 or memory array 220. Each of the memory arrays 210 and 220 includes four, 32K×8-bit RAM IC's (such as the HM65256AP manufactured by Hitachi). The memory IC's in each of the memory arrays 210 and 220 are configured to have mutually interconnected address and control terminals, but separate data input and output terminals. The combination of the 4 IC's appears as a memory array having 32,768 addressable blocks of data, where each block holds four, 8-bit pixels. In order to maintain a continuous flow, the data read and data write operations of the memory arrays 210 and 220 are interleaved. While data is being written into the memory array 210, data is being read out from the memory array 220, and vice-versa.

The interleaving of the reading and writing operations is achieved by dividing the field memory 28 into two sections, A and B. The address and control signals applied to section B are delayed by four periods of the system clock CK relative to the corresponding address and control signals applied to section A. In the system shown in FIG. 2, the input buffer 212, memory cell array 210 and output buffer 214 are in section A and the input buffer 222, memory cell array 220 and output buffer 224 are in section B.

The flow of pixels into and out of the field memory 28 is shown in TABLE 1. As shown therein, at the end of 4 clock periods, a block of 4 pixels, located at a starting address value ADR1, is ead out from the memory array 210. Four clock periods later, another block of 4 pixels is read out from the memory array 220 using the same address ADR1. While this is occurring, a block of 4 incoming pixels is written into the memory array 210 at another starting address location ADR2. Another 4 clock periods later, a block of 4 pixels, having an address ADR1+1, is read out from the memory array 210, and the next block of 4 incoming pixels are written into the memory array 220 at the address location ADR2, and so on. The process restarts every time the read and write address generators are reset in response to the sync signals.

TABLE 1

| INTER-VAL* | MEMORY ARRAY 210 | | MEMORY ARRAY 220 | |
|---|---|---|---|---|
| | OPERATION | ADDRESS | OPERATION | ADDRESS |
| 1 | READ | ADR1 | — | — |
| 2 | WRITE | ADR2 | READ | ADR1 |
| 3 | READ | ADR1 + 1 | WRITE | ADR2 |
| 4 | WRITE | ADR2 + 1 | READ | ADR1 + 1 |
| 5 | READ | ADR1 + 2 | WRITE | ADR2 + 1 |
| 6 | WRITE | ADR2 + 2 | READ | ADR1 + 2 |
| 7 | READ | ADR1 + 3 | WRITE | ADR2 + 2 |
| 8 | WRITE | ADR2 + 3 | READ | ADR1 + 3 |
| ... | ... | ... | ... | ... |

*Each interval consists of 4 periods of the 4 $F_{sc}$ clock signal CK.

Externally, the field memory 28 operates as follows: The incoming samples, occurring at the 4 $F_{sc}$ rate, are written into the memory 28 at successive locations starting with an initial address ADR2. On the output side, samples are simultaneously read out from the memory 28 at the 4 $F_{sc}$ rate from successive locations beginning with another starting address ADR1. The write and read address generators 32 and 34 are reset to their respective beginning addresses ADR2 and ADR1 in response to the horizontal and vertical sync signals HS and VS.

A memory sequencing circuit 30, responsive to the system clock signal CK, generates the control signals $\overline{IBEA}$, $\overline{WEA}$, $\overline{OEA}$, $\overline{CEA}$ $\overline{OLA}$, $\overline{LDO}$, and $\overline{LDI}$. The circuit 30 is reset at the beginning of each horizontal line of samples by the horizontal sync signal HS. This ensures that the first sample in any given line is stored in the field memory 28 on a block boundary. For further details on the construction and operation of the field memory 28, refer to above-mentioned commonly-assigned Shiratusuchi patent application (Ser. No. 38,260).

The read and write address signals applied to the field memory 28 have two parts: (1) a line address comprising the eight most significant bits (MSB's), and (2) a pixel block address consisting of the seven least significant bits (LSB's). The line addresses correspond to the 256 lines of video samples which may be written into or read out from the memory 28 during one field interval. The pixel block addresses (128 blocks total) correspond to the positions of successive blocks of eight pixels on a horizontal line of the video image (4 pixels each from the two memory arrays A and B). The combination of an 8-bit line address and a 7-bit pixel block address points to a particular block of (8) pixels in a particular line in the field memory 28.

The 7-bit pixel block address signal PBAS and the 8-bit line write address signal LNWAS used to write data into the field memory 28 are generated by a write address generator 32. The 8-bit line read address signal LNRAS (produced by a read address generator 34) is combined with the 7-bit pixel block address signal PBAS (produced by the write address generator 32) to read data from the field memory 28. The write address generator 32 includes two counters (not shown). The first counter is reset by the vertical sync signal VS, and incremented by the horizontal sync signal HS. The count value provided by this first counter is the line write address signal LNWAS. The second counter is reset by the horizontal sync signal HS and incremented by a signal CK/8 having a frequency that is one-eighth the frequency $4 F_{sc}$ of the system clock signal CK. This second counter produces the pixel block address signal PBAS which is used both for reading data from and writing data into the field memory 28.

The line write address signal LNWAS and the line read address signal LNRAS are applied to respective first and second input ports of a multiplexer 36 (mux, hereinafter). The mux 36 is controlled by a signal CK/8, having a frequency that is one-eighth of the frequency $4 F_{sc}$ of the system clock signal CK. The 8-bit signal provided by the mux 36 forms the eight MSB's of the address signal ADDRA applied to the field memory 28. The pixel block address signal PBAS forms the seven LSB's of the signal ADDRA. The pixel block address portion of the signal ADDRA changes every eight periods of the system clock signal CK to address successive blocks of eight pixels in a horizontal line (a total of 128 blocks). The line address portion of the signal ADDRA changes (a total of 256 times) every four periods of the signal CK, alternating between a line write address value LNWAS to be used to write data into the field memory 28 and a line read address value LNRAS to be used to read data from the memory.

Figure 3:
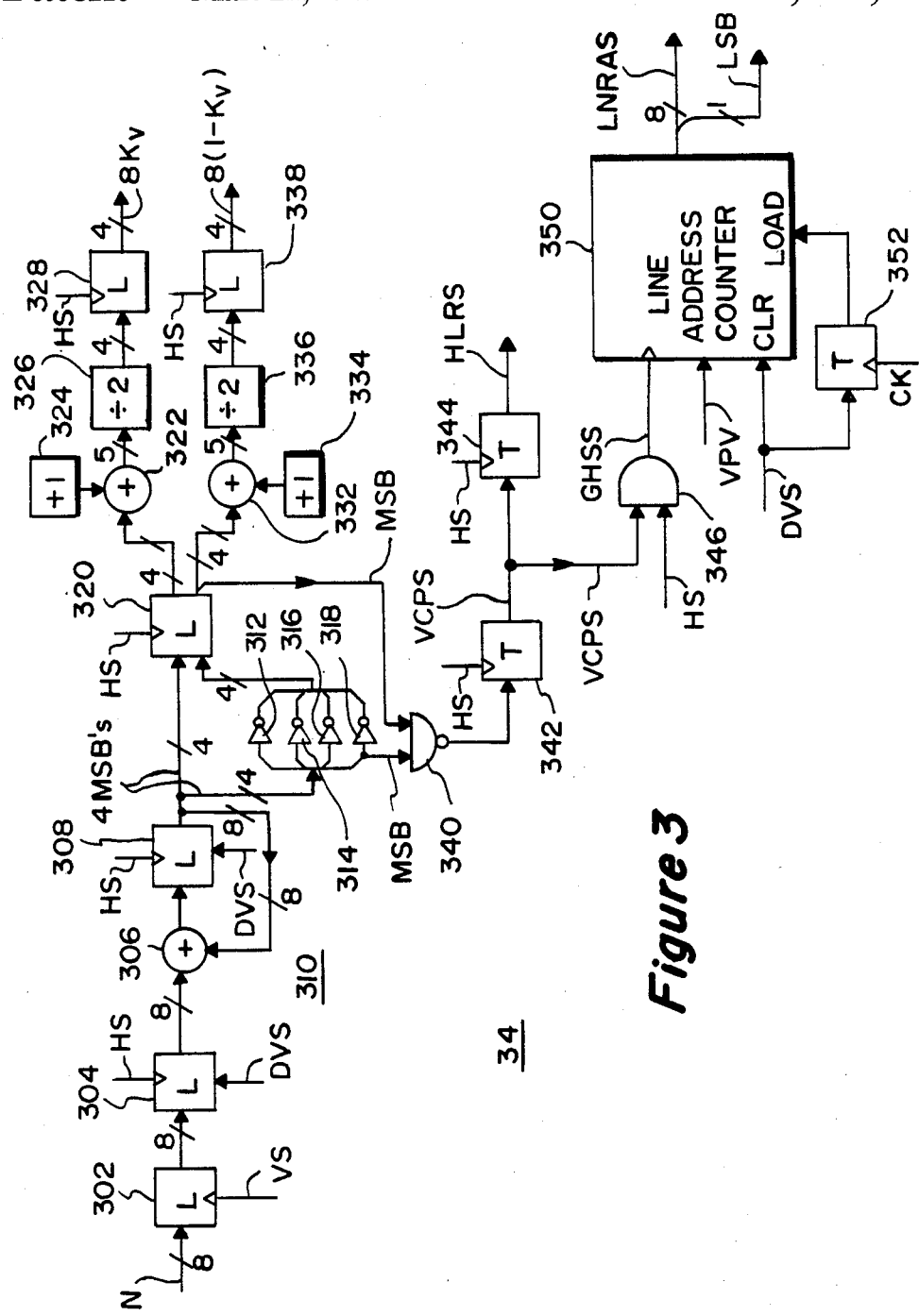
FIG. 3 illustrates circuitry for generating a line read address signal LNRAS and the luma vertical interpolation factors $K_v$ and $(1-K_v)$.

FIG. 3 is a block diagram of the read address generator 34. The read address generator 34 is responsive to the following signals:

A value N representative of the magnification factor MF (i.e., MF=M/N, where M is a constant).

A vertical position value VPV indicative of the position of the first line of the portion of the original image that is to be magnified. The values N and VPV are provided by a viewer-controlled circuit 38 shown in FIG. 1.

The horizontal sync signal HS.

The delayed vertical sync signal DVS.

In response to the signals listed above, the read address generator 34 develops the following signals:

The line read address signal LNRAS defining the 8-bit line address portion of the 15-bit read address signal. (The 7-bit pixel block address portion PBAS of the 15-bit read address signal is generated by the write address generator 32.)

A horizontal line recirculate signal HLRS used by a Y/C separator 40.

The scale factors $8K_v$ and $8(1-K_v)$ used by a luma vertical interpolator 42.

A vertical count pause signal VCPS for selectively disabling a line address counter 350.

In order to understand the function of the circuitry shown in FIG. 3, it is helpful to first understand how successive lines of samples of the original video image are interpolated to obtain new lines of samples representing the magnified image. The interpolation method used in this embodiment of the invention divides the space between any two successive lines in the original image into potential interstitial line locations. The magnification factor MF(M/N) used in this embodiment ranges from approximately 1 to 2, in steps of 1/256 (i.e. from 256/255 to 256/128). This is desirable to produce the illusion of a continues zoom when the magnification factor MF is changed. It is also important for maintaining the spatial correctness of the entire image. The 256 potential interstitial line locations between any two successive lines are next grouped together into a smaller number of locations (9) for the purpose of interpolating an individual line of samples without seriously affecting the performance of the system.

Figure 4:
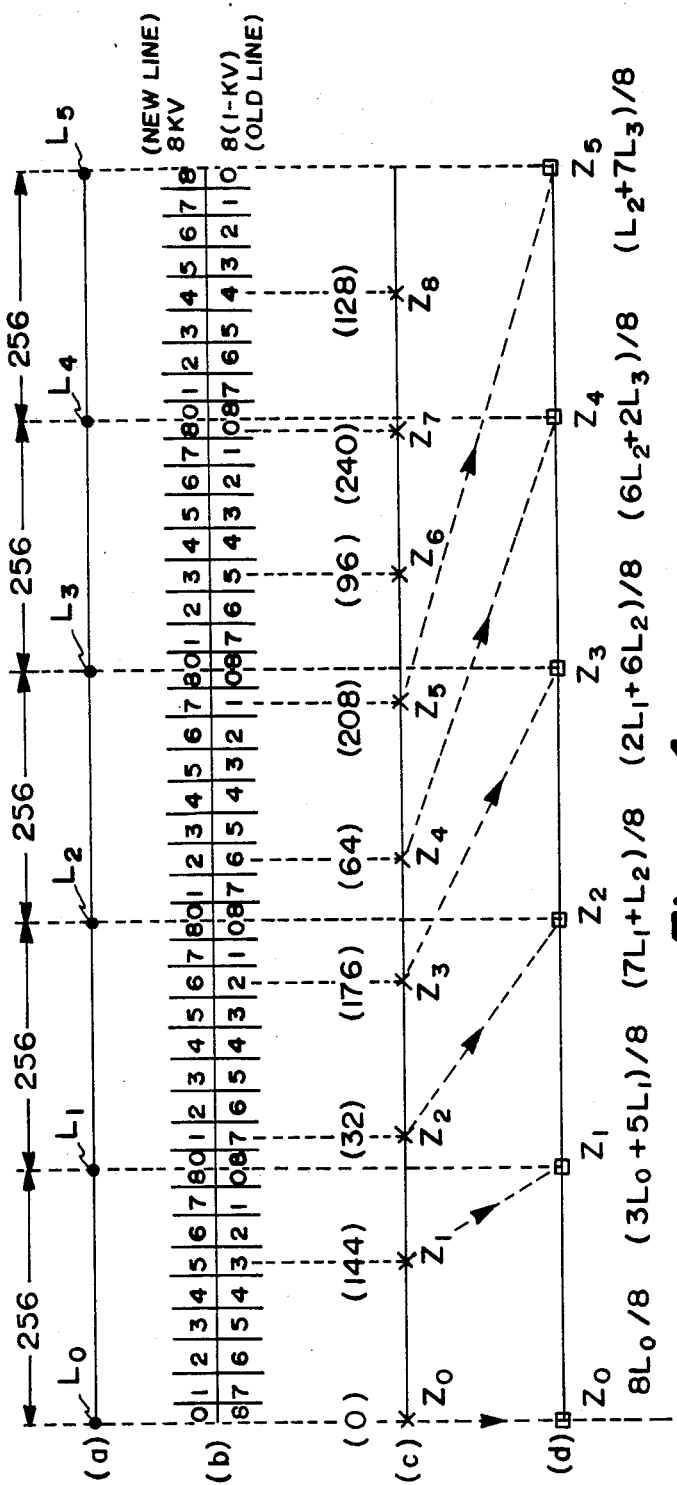
FIG. 4 shows timing diagrams useful for understanding the operation of the FIG. 3 circuitry.

FIG. 4 shows the timing diagrams (a) through (d), which illustrate how a new line of samples is interpolated from a pair of successive original lines of samples. The timing diagram FIG. 4(a) illustrates how the interval between successive original lines of samples is divided into 256 parts. The timing diagram FIG. 4(b) shows how these 256 parts are grouped together into nine interpolation zones. The timing diagram FIG. 4(c) shows how the interpolation is performed for a magnification factor MF of 1.78 (i.e., 256/144). The timing diagram FIG. 4(d) depicts how the original picture is vertically extended.

The position of individual lines of samples within the 9 interpolation zones shown in the timing diagram FIG. 4(b) are determined by repeatedly adding the value 144 (i.e., N=144) to the value held by a modulo 256 accumulator (i.e., M=256). The first addition produces a value of 144, placing the first interpolated sample in a zone, where ⅝ of the current line of samples $L_1$ and ⅜ of the prior line of samples $L_0$ are summed to develop the interpolated new line of samples $Z_1$. Adding 144 to the accumulator again yields a value of 32 (288 modulo 256). The line of samples $Z_2$ is formed by adding ⅛ of each sample in the current line $L_2$ to 7/8 of the corresponding sample in the prior line of samples $L_1$. The lines of samples $Z_3$ through $Z_8$ are formed by repeatedly adding 144 to the modulo 256 accumulated value and then using the relationship illustrated by the timing diagram FIG. 4(b) to determine interpolation factors to be used. The timing diagrams FIGS. 4(c) and 4(d) illustrates how the original picture is magnified in the vertical direction when the interpolated lines of samples $Z_0$ through $Z_5$ are displayed at the same position as intended for the original lines of samples $L_0$ through $L_5$.

Referring to FIG. 3, the digital value N is applied to an adder 306 via a pair of cascade-connected latches 302 and 304. The latch 302 is clocked by the vertical sync signal VS. The latch 304 is reset by the delayed vertical sync signal DVS, and clocked by the horizontal sync signal HS.

The adder 306 sums the value N from the latch 304 with the value held by an 8-bit register 308. The register 308 is reset by the delayed vertical sync signal DVS, and clocked by the horizontal sync signal HS to store the 8-bit value provided by the adder 306 once per horizontal line period. The adder 306 and register 308 form a modulo 256 accumulator 310. As set forth above, the output value provided by the modulo 256 accumulator 310 is the position of the interpolated line from among the 256 potential horizontal line positions between any two successive lines of the original image. The output values of the modulo 256 accumulator 310 are illustrated in FIG. 4C.

In the FIG. 3 circuit, only the four MSB's of the value provided by the register 308 are used in determining the respective contributions of the current and prior lines to the interpolated values. Using only the four MSB's effectively divides the value provided by register 308 by 16. Thus, the range of available values is automatically reduced from 0-255 to the range 0-15. The number represented by the four MSB's corresponds to the contribution of the current line to the interpolated value.

The four MSB's are coupled to a set of four inverters 312, 314, 316 and 318 which produce the one's complement of the value of the four MSB's. The one's complement value corresponds to the contribution of the previous line to the interpolated value.

The four MSB's of the value provided by the register 308 and the complemented four MSB's are next concatenated as LSB's and MSB's respective to produce values applied to a delay element 320. The delay element 320 is a synchronizing delay used to align the interpolation scale factors $K_v$ and $1-K_v$ with the line read address signal LNRAS and the horizontal line recirculate signal HLRS.

The value represented by the 4 LSB's of the signal provided by the delay element 320 (i.e., the 4 MSB's of the value provided by the register 308) is added to a value of one (in an adder 322) and divided by two (in a divider 326) to produce an integer value 8 $K_v$ in the range of 0-8. The output of the divider 326 is delayed by a synchronizing delay element 328.

The value represented by the 4 MSB's of the by the delay element 320 (i.e., the one's complement of the 4 MSB's of the value provided by the register 308) is added to a value of one (in an adder 332) and divided by two (in a divider 336) to produce an integer value 8 $(1-K_v)$ in the range of 0-8. The output of the divider 336 is delayed by a synchronizing delay element 338.

The signal 8 $K_v$ represents the first vertical interpolation scaling factor. It corresponds to the contribution of the current line to the interpolated value. The signal 8 $(1-K_v)$ represents the second vertical interpolation scaling factor. It corresponds to the contribution of the prior line to the interpolated value. The signals 8 $K_v$ and 8 $(1-K_v)$ are used by a luma vertical interpolation circuit 42, depicted in FIG. 7, to develop the interpolated lines of samples representing the magnified images. FIG. 4B illustrates how the factors 8 $K_v$ an 8 $(1-K_v)$ are mapped onto the 256 interstitial line positions between successive lines of samples.

A signal representing the most significant bit of the value provided by the delay element 320 and a signal representing the most significant bit of the value provided by the register 308 are combined in a NAND gate 340 to produce a signal, which, when delayed by one horizontal line period by the delay element 342, becomes the vertical count pause signal VCPS. The VCPS signal is a logic zero only when two successive interpolated lines of samples are to be interpolated from the same two lines of samples from the original image.

The vertical count pause signal VCPS is next delayed by one period of the horizontal sync signal HS (in a delay element 344) to develop the horizontal line recirculate signal HLRS.

The vertical count pause signal VCPS is applied to one input terminal of an AND gate 346. Another input terminal of the AND gate 346 is coupled to receive the horizontal sync signal HS. The gated horizontal sync signal GHSS provided by the AND gate 346 is applied to the clock input terminal of a counter 350 which produces the line address portion LNRAS of the read address signal RAS. The counter 350 increments its value once per horizontal line period unless the lines of samples used to generate the next interpolated line are the same as those that were used to generate the prior interpolated line. The counter 350 is cleared by the delayed vertical sync signal DVS. The vertical position value VPV is then loaded as an initial value into the counter 350 in response to a delayed version of the signal DVS provided by the delay element 352. This ensures that the lines of samples read from the field memory 28 during one display field interval are all from the same field of the input video signal. Displaying samples from a single input field during a single display field interval is desirable to avoid a "tearing" of the image which may occur because of interfield motion.

Figure 5:
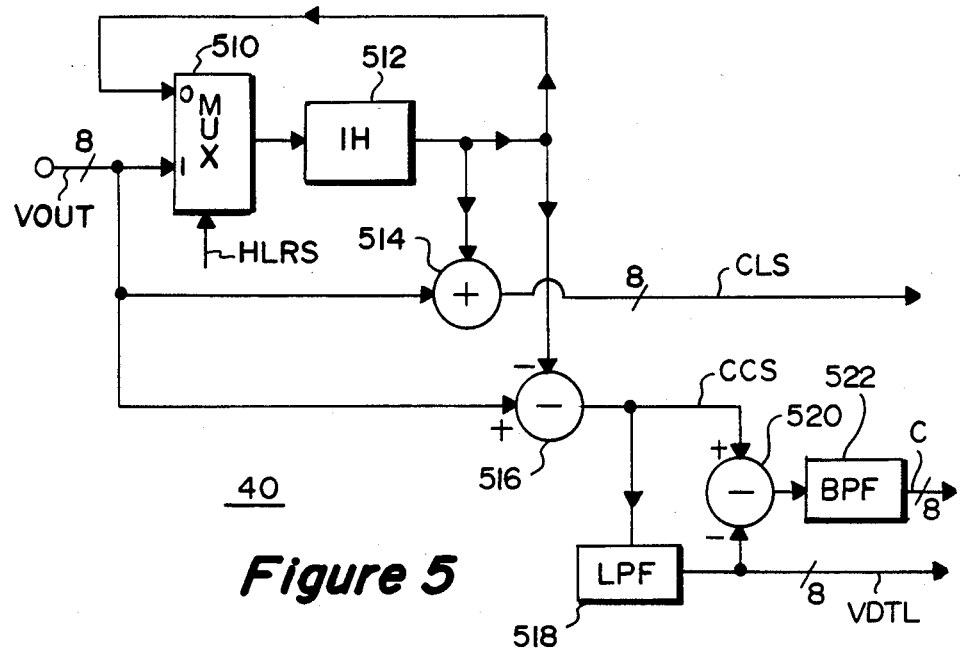
FIG. 5 is a block diagram of a Y/C separator suitable for use in the zoom system of FIG. 1.
Figure 6:
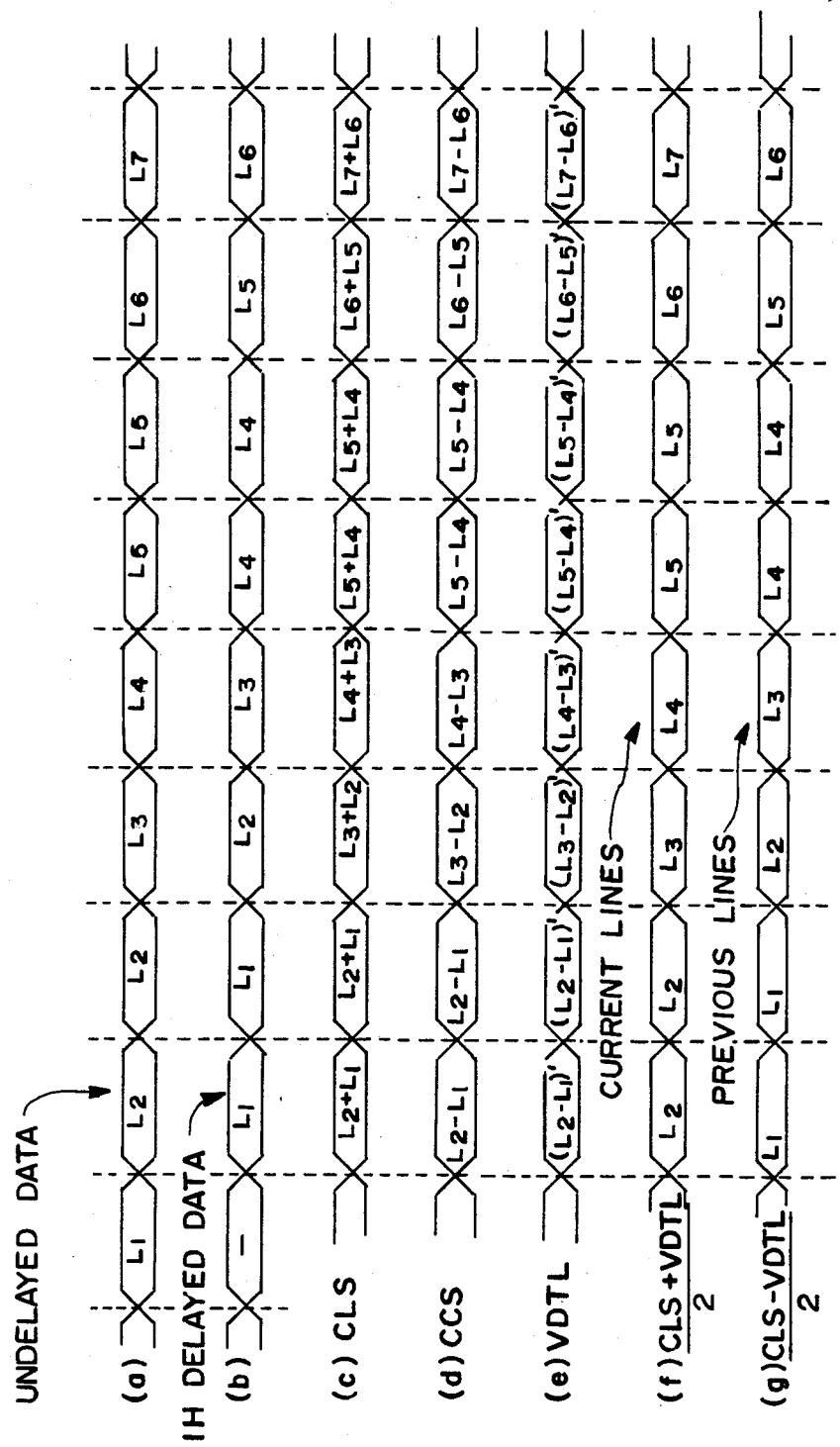
FIG. 6 depicts timing diagrams helpful for understanding the operation of the FIG. 5 Y/C separator.

FIG. 5 is a block diagram of the Y/C separator 40. The lines of samples of the video signal VOUT provided by the field memory 28 are applied to one input port of a multiplexor (hereinafter, mux) 510. The output port of the mux 510 is coupled to a IH delay element 512. The output signal provided by the IH delay element 512 is applied to a second input port of the mux 510. The control input terminal of the mux 510 is coupled to receive the horizontal line recirculate signal HLRS. When the signal HLRS is a logic one, the mux 510 is conditioned to pass the signal VOUT to the 1H delay element 512. When the signal HLRS is a logic zero, however, the mux 510 is conditioned to recirculate the samples provided by the 1H delay element 512 back to the input terminal of the delay element. In FIG. 6, the timing diagrams (a) and (b) respectively represent the undelayed and 1-H delaye composite video signal samples.

The remainder of the circuitry shown in FIG. 5 implements a conventional 1H comb filter. Corresponding samples from a delayed line of samples and from an undelayed line of samples are summed in an adder 514 to provide a combed luma signal CLS [timing diagram FIG. 6(c)]. The delayed samples are subtracted from the undelayed samples in a subtracter 516 to produce a combed chroma signal CCS [timing diagram FIG. 6(d)]. The horizontal line recirculate signal HLRS conditions the 1H comb filter to use samples from the same pair of lines to generate the combed luma and chroma signals CLS and CCS when two successive lines of the vertically expanded video signal are to be interpolated from the same pair of lines of the original video signal.

The combed chroma signal CCS is applied to a low-pass filter (LPF) 518, having a passband extending up to about 2 MHz, to generate a luma vertical detail signal VDTL [timing diagram FIG. 6(e)]. The VDTL signal is subtracted from the combed chroma signal CCS in a subtractor 520 to eliminate from the combed chroma signal CCS the relatively low frequency luma vertical detail components. The output of the subtracter 520 is applied to a bandpass filter (BPF) 522 having a passband (e.g., 3.58±0.5 MHz) centered around the color subcarrier center frequency $F_{sc}$. The output of the bandpass filter 522 is the bandpass-filtered chroma signal C.

FIG. 7 is a block diagram of the luma vertical interpolator 42. As shown therein, the combed luma signal CLS is applied to a delay element 710. The delay element 710 compensates the combed luma signal CLS to align it with the lowpass-filtered vertical detail signal VDTL. An adder 712 and a subtracter 718 respectively add the vertical detail signal VDTL to and subtract the signal VDTL from the combed luma signal CLS provided by the delay element 710.

The signals developed by the adder 712 and subtracter 718 approximate the luma signal components of two successive lines of the original video signal. The luma samples [timing diagram FIG. 6(f)] produced by the adder 712, which approximate the luma samples from a current line of video signal, are multiplied, in a multiplier 714, by the interpolation scale factor $8K_v$ provided by the read address generator 34. The output signals of the multiplier 714 are applied to one input port of an adder 716.

The luma samples [timing diagram FIG. 6(g)] provided by the subtracter 718, which approximates luma samples from the previous line of video signal, are scaled by the interpolation scale factor $8(1-K_v)$ in a multiplier 720. The output signal of the multiplier 720 is applied to a second input port of the adder 716. The output signal of the adder 716 is divided by 8 in the circuitry 722 to produce the vertically interpolated luma signal Y'.

Referring to FIG. 1, the signal Y' developed by the luma vertical interpolator 42 is applied to a hanging dot corrector 44. The circuit 44 is of the same type as that described in U.S. Pat. No. 4,636,842 entitled "Comb Filter 'Hanging Dot' Eliminator". It removes spurious chrominance signal components from the vertically interpolated luma signal Y' based on the magnitude of the vertical detail signal VDTL.

The signal Y' provided by the hanging dot corrector 44 is applied to a luma horizontal interpolator 46 shown in FIG. 8. The circuit 46 interpolates samples for insertion between pairs of successive samples in each line of the signal Y' to develop the signal Y'' which is expanded both vertically and horizontally relative to the video signal provided by source 22. The circuit 46 is divided into two parts. The circuitry which processes the signal Y' to produce the signal Y'' is inside a dashed-line box 810. The remainder of the circuitry shown in FIG. 8 controls the boxed circuitry 810.

The vertically expanded luma signal Y' is applied to the input port of a demultiplexer (hereinafter, demux) 12. The demux 812 applies the lines of samples of the luma signal Y' alternately to a pair of line memories 814 and 816. The signal controlling the demux 812 is generated by halving the frequency of the horizontal sync signal HS in a frequency divider 832. The output ports of the line memories 814 and 816 are coupled to respective first and second input ports of a mux 818. The mux 818 is controlled by the signal HS/2 generated by the frequency divider 832 (1) to provide samples from the line memory 814 when the demux 812 is applying samples to the line memory 816, and (2) to provide samples from the line memory 816 when the demux 812 is applying samples to the line memory 814.

The samples provided by the mux 818 are applied to a delay element 820 which is controlled by a luma gated clock signal LGCS' provided by an AND gate 868 as set forth below. The delay element 820 provides samples to a multiplier 824 and to a delay element 822. The delay element 822 is also clocked by the gated clock signal LGCS' provided by the AND gate 868 The samples provided by the delay element 822 are applied to a multiplier 826. The multipliers 824 and 826, which are conventional 8-bit×8-bit multipliers, scale the sample values provided by the respective delay elements 820 and 822 by interpolation factors $8 K_H$ and $8 (1-K_H)$ provided by dividing circuits 878 and 880, respectively. The scaled samples provided by the multiplying circuits 824 and 826 are summed in an adder 828 and divided by eight in the sample value dividing circuitry 830 to produce samples representing the vertically and horizontally expanded luma signal Y'''.

The circuitry that controls the interpolating circuitry 810 develops the address values used to access the line memories 814 and 816 and the interpolation scale factors $8 K_H$ and $8 (1-K_H)$ used by the multipliers 824 and 826.

Each of the line memories 814 and 816 is a random access memory. Addresses used to access the line memories 814 and 816 are respectively provided by the muxes 836 and 834. Each of the muxes 834 and 836 are coupled to receive a luma pixel read address signal LPRAS at respective first input ports from a pixel read address counter 838 and to receive a luma pixel write address signal LPWAS at respective second input ports from a pixel write address counter 840. The muxes 834 and 836 are conditioned by the signal HS/2 provided by the frequency divider 832 to apply the luma pixel write address signal LPWAS to the line memory coupled to receive the luma samples from the demux 812, and to apply the luma pixel read address signal LPRAS to the other of the line memories.

The write address counter 840 is a 10-bit counter, which is clocked by the 4 $F_{sc}$ clock signal CK and reset by the horizontal sync signal HS. The read address counter 838 is a presetable 10-bit counter which is clocked by a luma gated clock signal LGCS and which is loaded with the horizontal position value HPV (provided by the viewer-controlled circuit 38) in response to a delayed version of the horizontal sync signal HS provided by a delay element 842.

The gated clock signal LGCS (provided by an AND gate 844) is the logical AND of the 4 $F_{sc}$ clock signal CK and a luma horizontal count pause signal LHCPS provided by a NAND gate 864. The signal LHCPS inhibits the read address counter 838 from incrementing when two successive interpolated pixels are to be developed from a single pair of samples values of the luma signal Y'.

The circuitry which generates the signal LHCPS also generates the horizontal interpolation scale factors 8 $K_H$ and $8 (1-K_v)$ used to develop the signal Y'''. As a first step in developing these factors, the value N (representative of the magnification factor MF), is applied to one input port of an adder 850. The output port of the adder 850 is coupled to the port of an 8-bit register 852, which is clocked by the system clock signal CK and reset by the horizontal sync signal HS. The output port of the register 852 is coupled to a second input port of the adder 850. The register 852 and the adder 850 form a modulo 256 accumulator 848. The four MSB's of the value provided by the register 852 are applied to the input port of a delay element 862 both directly and via the respective inverters 854, 856, 858 and 860. The signal applied to the delay element 862 is an eight-bit signal. The four-bits provided by the inverters 854 through 860 are the four MSB's of this eight-bit signal and the four-bits provided by register 852 directly form the four LSB's of the signal.

The most significant bit of the signal provided by the register 852 and the most significant bit of the signal provided by the delay element 862 are applied to the NAND gate 864 to generate the luma horizontal count pause signal LHCPS. The signal LHCPS has a value of logic zero only when two successive samples of the interpolated signal Y" are developed from the same pair of samples of the signal Y'.

In addition to selectively disabling the clock input signal to the read address counter 838, the signal LHCPS is delayed by one period of the system clock signal CK, via the delay element 866, and applied to the input terminal of the AND gate 868. Another input terminal of the AND gate 868 is coupled to receive the system clock signal CK. The signal provided by the AND gate 868 cycles successive samples of the signal Y' through the delay elements 820 and 822 for use by the interpolating multipliers 824 and 826. When the same two values of the signal Y' are used to develop two samples of the signal Y", the gated clock signal LGCS' applied to the delay elements 820 and 822 is disabled for one period of the system clock signal CK. The samples provided by the delay elements 820 and 822 are processed by the multipliers 824 and 826 as set forth above.

To develop the horizontal interpolation scale factors 8 $K_H$ and 8 $(1-K_H)$, the value represented by the four LSB's of the signal provided by the delay element 862 is added, in an adder 870, to a value of one supplied by a digital value source 872 The signal developed by the adder 870 is applied to a divider 878 which divides it by two to produce the first horizontal interpolation factor $8K_H$. This factor is applied to the interpolating multiplier 824.

Similarly, the value represented by the four MSB's of the signal provided by the delay element 862 is added, in an adder 874 to a value of one provided by a digital value source 876. The values developed by the adder 874 are divided by two in the dividing circuitry 880 to produce the second horizontal interpolation factor 8 $(1-K_H)$. This factor is applied to the interpolating multiplier 826.

The operation of the chroma line inverter 48 will be next explained with the help of FIG. 9. The column (b) in FIG. 9 depicts the phase of the successive lines of the chroma signal (i.e., $L_i$-$L_{i-1}$) defining the original image. As shown therein, the phase of the chroma signal changes by 180° on a line-to-line basis. This is because the unmodulated frequency $F_{sc}$ of the color subcarrier signal is an odd multiple of one-half the horizontal line frequency $F_H$[i.e., $F_{sc}=(455/2)\times F_H$]. However, when the lines of samples are repeated to vertically extend the original image, the chroma signal does not always maintain line-to-line phase relationship.

The second column (d) in FIG. 9 represents the phase of the vertically-extended chroma signal C from the Y/C separator 40. The sequence of the lines of the chroma samples in the column (d) of FIG. 9 is the same as that shown in the timing diagram FIG. 6(d). The vertically-extended chroma signal on lines 2, 3, 4 and 5 is 180° out of phase as compared to the desired phase of the chroma signal (i.e., 180° change in phase on a line-to-line basis).

In accordance with this invention, a chroma line inverter 48 selectively inverts the polarity of the chroma signal C in response to the chroma line invert signal CLINV [shown in FIG. 9(e)] to restore the phase coherence. The circuit 48 starts inverting the polarity of the chroma samples when two new lines of chroma samples (e.g., lines $L_2$-$L_1$ and $L_2$-$L_1$) are generated from the same two lines of the original samples (e.g., $L_1$ and $L_2$) It continues to invert the polarity of the successive lines of chroma samples (e.g., lines $L_3$-$L_2$, $L_4$-$L_3$ and $L_5$-$L_4$) until two new lines of chroma samples (e.g., line $L_5$-$L_4$ and $L_5$-$L_4$) are again produced using two identical lines of original samples (e.g., lines $L_4$ and $L_5$.)

The column (f) in FIG. 9 shows the phase-corrected chroma signal C' at the output of the chroma inverter 48. As shown therein, the phase of the vertically-extended chroma signal C' varies by 180° on a line-to-line basis.

The chroma line inverter 48 may consist of a plurality of inverters and muxes to selectively invert the polarity of the vertically-expanded chroma signal C. One skilled in the art of digital video signal processing circuit design will be able to build a suitable chroma inverter from the description set forth above in conjunction with FIG. 9.

FIG. 10 is a block diagram of a circuit 1000 for generating the chroma line invert signal CLINV, which is used for selectively inverting the polarity of the vertically-expanded chroma signal. The chroma line invert signal generating circuit 1000 responds to the following input signals:

The horizontal sync signal HS.

The least significant bit (LSB) of the line read address signal $\overline{LNRAS}$.

A motion/still signal $\overline{M/S}$.

A field flag signal FFS.

The line read address signal LNRAS is reset in response to the delayed vertical sync signal DVS, and incremented by a gated horizontal sync signal GHSS, as shown in FIGURE 3. The LNRAS signal increments its value once per horizontal line period (1H) unless a line of samples is to be repeated to vertically extend the image.

When the magnification factor MF is one, the LNRAS signal is incremented every horizontal line. In this situation, the LSB of the LNRAS signal toggles between a logic one and a logic zero at the horizontal line rate $F_H$.

When the magnification factor MF is two, the LNRAS signal is incremented every two horizontal lines. In this situation, the LSB of the LNRAS signal toggles between high and low values at one-half the line rate ($F_H/2$)

In the motion zoom mode, the $\overline{M/S}$ goes high. In this mode, the incoming fields are written into the field memory 28, zoomed and displayed on the TV screen to produce a moving zoom. In the one-field still zoom mode, the $\overline{M/S}$ signal is brought low. In this mode, a first one of the two fields is written into the field memory 28, and then repetitively read out, zoomed and displayed on the TV screen to provide a still zoom.

The field flag signal FFS has a 262H period for the first field F1 and a 263H period for the second field F2 in the manner shown by the timing diagram (a) in FIG. 11. The field flag signal FFS is applied to the data input terminal of a flip-flop 1002. The flip-flop 1002 is clocked by the 4 $F_{sc}$ clock signal CK. The output of the flip-flop 1002 is inverted (by an inverter 1004), and applied to a second flip-flop 1006. The flip-flop 1006 is also clocked by the $4F_{sc}$ clock signal CK. The outputs of the two flip-flops 1002 and 1006 are ANDed in an AND gate 1008.

The output TSI of the AND gate 1008 is used to initialize a flip-flop 1012, and to clock a flip-flop 1014. The signal TS1 is a positive going pulse having the duration of one cycle of the $4F_{sc}$ clock CK at the beginning of each first field F1 of 262 horizontal lines, as depicted by the timing diagram (b) in FIG. 11.

The outputs TS2 and TS3 of the two flip-flops 1012 and 1014 are applied to an exclusive OR gate 1016. The output TS4 of the exclusive OR gate 1016 and the LSB of the line read address signal LNRAS are applied to a second exclusive OR gate 1018. The output of the second exclusive OR gate 1018 is the chroma line invert signal CLINV.

The flip-flop 1012 provides the phase reference signal TS2 to the second exclusive OR gate 1018 for comparison with the LSB of the LNRAS signal. The phase reference signal TS2 is reset at the start of each first field F1, and toggles between a logic one and a logic zero at the line rate $F_H$.

When the TV receiver 20 is in the motion zoom mode, the signal M/$\overline{S}$ is brought high. This causes the output TS3 of the flip-flop 1014 to go low. When TS3 is low, the exclusive OR gate 1016 passes the phase reference signal TS2 unaltered.

When the TV receiver 20 is in the one-field still zoom mode, the signal M/$\overline{S}$ goes low. When the signal M/$\overline{S}$ is low, the output TS3 of the flip-flop 1014 toggles between a logic one and a logic zero at the frame rate in the manner shown by the timing diagram (c) in FIG. 11. When the signal TS3 is high, the exclusive OR gate 1016 inverts the phase reference signal TS2. Otherwise, the phase reference signal TS2 is passed unaltered.

The signal TS1 initializes the flip-flop 1012 at the beginning of each first field FF in order to ensure that the phase reference signal TS2 starts with an identical state (i.e., a logic zero) in every field regardless of which of the two fields (the 262H first field F1 or the 263H second field F2) is currently being read out of the field memory 28. Because the phase reference signal TS2 is reset at the start of the first field F1 and because there are an even number of lines (i.e., 262) in the first field, the phase reference signal TS2 automatically starts out with the identical state (i.e., a logic zero) at the beginning of the second field F2 (without any need for additional initialization at the beginning of the second field). The phase reference signal TS2 is, however, reset at the start of the first field F1 because there are an odd number of lines in the second field F2 (i.e., 263 lines).

The signal TS3 is a logic zero when the TV receiver 20 is in the motion zoom mode. This conditions the exclusive OR gate 1016 to pass the phase reference signal TS2 unaltered. In the one-field still zoom mode, the phase reference signal TS2 is, however, inverted every other frame by using the signal TS3. This is so because a single field of the incoming video signal is repetitively used for generating all the fields in a 4-field sequence in the one-field still zoom mode.

The vertically-expanded and phase-restored chroma signal C' from the chroma line inverter 48 is applied to a chroma horizontal expander 50 pursuant to the principles of this invention. The chroma horizontal expander 50 extends the vertically-expanded chroma signal C' in the horizontal direction by selectively repeating the chroma pixels and by inverting the polarity of the horizontally-expanded chroma signal to restore the phase coherence of the output signal C''.

The procedure used for horizontally expanding the chroma signal and then restoring the phase of the horizontally-expanded chroma signal will be next explained in conjunction with FIG. 12. The hardware used for implementing the aforesaid procedure will be then explained in reference to FIGS. 13-16. The circuitry used for horizontally expanding the chroma signal C' is generally similar to the FIG. 8 circuitry 48 for expanding the luma signal Y' in the horizontal direction.

The timing diagram (a) in FIG. 12 shows the digital chroma samples $S_0$, $S_1$, $S_2$ . . . representative of the chroma signal C', which is to be expanded horizontally. The chroma samples $S_0$, $S_1$, $S_2$. . . occur at the $4 F_{sc}$ rate. To simplify the illustration, it is assumed that the chroma signal C' has the same frequency and phase as the color burst signal. Physically, this represents a shade of yellow color on the TV screen.

In the timing diagram FIG. 12(b), successive pairs of chroma samples ($S_0$, $S_1$), ($S_2$, $S_3$), ($S_4$, $S_5$), ($S_6$, $S_7$), ($S_8$, $S_9$) . . . are, in turn, represented by equivalent color samples $C_0$, $C_1$, $C_2$, $C_3$, $C_4$ . . . , occurring at the $2 F_{sc}$ rate. The equivalent chroma sampling frequency $2 F_{sc}$ is more than adequate to reproduce the entire chroma signal spectrum.

The timing diagram FIG. 12(c) shows the successive positions $X_0$, $X_1$, $X_2$ . . . corresponding to the new chroma samples for the magnified picture. To generate the new chroma sample positions $X_0$, $X_1$, $X_2$ . . . , the space between successive equivalent chroma pixels $C_0$, $C_1$, $C_2$ . . . is divided into 256 parts. The successive positions of the new chroma pixels are then determined by repetitively adding an incremental digital value N (between 128 and 255) to a modulo 256 accumulator (M=256).

The digital values representative of the chroma pixels corresponding to the chroma pixel positions $X_0$, $X_1$, $X_2$ . . . are next determined. In the algorithm depicted in FIG. 12, the digital values of the new chroma pixels are assumed to be the same as the values of the immediately preceding equivalent chroma pixels, as shown in the timing diagram (d). For example, the values of the new chroma pixels that correspond to the positions $X_0$, $X_1$, $X_2$, $X_3$, $X_4$, $X_5$, $X_6$, $X_7$ . . . are established at $C_0$, $C_0$, $C_1$, $C_2$, $C_3$, $C_3$, $C_4$, $C_5$ . . . , respectively.

In the timing diagram FIG. 12(e), the newly generated chroma pixels $C_0$, $C_0$, $C_1$, $C_2$, $C_3$, $C_3$, $C_4$, $C_5$ . . . (corresponding to the pixel positions $X_0$, $X_1$, $X_2$, $X_3$, $X_4$, $X_5$, $X_6$, $X_7$ . . . ) are replaced by their respective original values:

($S_0$, $S_1$), ($S_0$, $S_1$), ($S_2$, $S_3$), ($S_4$, $S_5$), ($S_6$, $S_7$), ($S_6$, $S_7$) ($S_8$, $S_9$), ($S_{10}$, $S_{11}$) . . . , respectively.

It will be seen from the timing diagram FIG. 12(e) that the polarities of the newly generated chroma pixels corresponding to the positions $X_1$, $X_2$, $X_3$ and $X_4$ are inverted in comparison with the chroma signal C' shown in the diagram (a).

To faithfully reproduce the original colors (e.g., yellow) in the magnified picture, the phase of the horizontally-expanded chroma signal must remain the same as the phase of the original chroma signal C' that is being expanded. Any changes in the phase of the reconstructed chroma signal degrades reproduction of colors on the TV screen.

The timing diagram FIG. 12(f) represents a chroma pixel invert signal CPINV. The polarity of the horizontally-expanded chroma signal, depicted in the timing diagram FIG. 12(e), is inverted in response to the CPINV signal to develop the horizontally-expanded and phase-restored chroma signal C" shown in the timing diagram (g).

FIGS. 13 and 15 show the hardware used for implementing the FIG. 12 procedure. The FIG. 13 circuitry is used (1) for selectively repeating the chroma pixels to stretch the chroma signal C' in the horizontal direction, and (2) for selectively inverting the polarity of the horizontally-stretched chroma signal to restore the phase coherence in the output signal C". The circuitry depicted in FIG. 15 is employed for generating various control signals used in the FIG. 13 circuitry. FIGS. 14 and 16 are timing diagrams useful for understanding the circuits in FIGS. 13 and 15, respectively.

As shown in FIG. 13, the vertically-expanded and phase restored chroma signal C' from the chroma line inverter 48 is applied to a demux 1302. The demux 1302 applies the lines of samples of the chroma signal C' alternately to a pair of random access line memories 1304 and 1306. The signal controlling the demux 1302 is generated by halving the frequency of the horizontal sync signal HS in a frequency divider 1308. The output ports of the line memories 1304 and 1306 are coupled to respective first and second input ports of a mux 1310. The mux 1310 is controlled by the signal generated by the frequency divider 1308 to provide samples from the line memory 1304 when the demux 1302 is conditioned to apply samples to the line memory 1306. The mux 1310 is conditicned to provide samples from memory 1306 when the demux 1302 is conditioned to apply samples to the line memory 1304.

The output of the mux 1310 is applied to a pair of latches 1314 and 1316. The two latches 1314 and 1316 are respectively clocked by a first gated clock signal CGCS' occurring synchronously with a $F_{sc}$ clock signal and a second gated clock signal CGCS" occurring synchronously with a $2\overline{F_{sc}}$ clock signal.

The outputs of the two latches 1314 and 1316 are applied to a mux 1318 controlled by a mux control signal MCS. The output of the mux 1318 is applied to a chroma pixel inverter 1320. The chroma pixel inverter 1320, responsive to the chroma pixel invert signal CPINV, selectively inverts the polarity of the horizontally-expanded chroma signal, whereby phase coherence is restored in the output signal C".

Each of the line memories 1304 and 1306 is a values used to access the random access memory. Address values used to access the line memory 1304 are provided by a mux 1330. Address values used to access the line memory 1306 are provided by the mux 1332. Each of the muxes 1330 and 1332 are coupled to receive a chroma pixel read address signal CPRAS at respective first input ports from a pixel read address counter 1334 and to receive a chroma pixel write address signal CPWAS at respective second input ports from a pixel write address counter 1336. The muxes 1330 and 1332 are conditioned by the HS/2 signal provided by the frequency divider 1308 to apply the chroma pixel write address signal CPWAS to the line memory coupled to receive chroma samples from the demux 1302, and to apply the chroma pixel read address signal CPRAS to the other one of the line memories The write address counter 1336 is a 10-bit counter which is clocked by the 4 $F_{sc}$ clock signal CK, and which is reset by the horizontal sync signal HS. The read address counter 1334 is a presettable 10-bit counter which is clocked by a chroma gated is loaded with the horizontal position value HPV (provided by the viewer-controlled circuit 38) in response to a chroma horizontal position load signal CHPLS.

As shown in FIGS. 13 and 15, the chroma gated clock signal CGCS is the logical AND of the 4 $F_{sc}$ clock signal and a chroma horizontal count pause signal CHCPS. The signal CHCPS inhibits the pixel read address counter 1334 from incrementing when an equivalent chroma sample (e.g., $C_3$) is repeated to expand the chroma signal C' in the horizontal direction.

The operation of the FIG. 13 circuit will be next explained with the help of the timing diagrams in FIG. 14. It will be recalled that the pixel read address counter 1334 is clocked by the chroma gated clock signal CGCS. The chroma gated clock signal CGCS, generated by ANDing the 4 $F_{sc}$ clock signal with the chroma horizontal count pause signal CHCPS, is shown in the timing diagram FIG. 14(g). The output CPRAS of the pixel read address counter 1334 is shown in the timing diagram FIG. 14(h). The mux 1310 generates a stream of chroma pixels $S_0$, $S_1$, $S_2$, $S_3$, $S_4$, $S_4$, $S_4$ . . . indicated in the timing diagram FIG. 14(i).

The chroma pixels $S_0$, $S_1$, $S_2$ . . . are simultaneously applied to the latches 1314 and 1316, which are respectively clocked by the first and second gated clock signals CGCSI' and CGCS2" shown in the timing diagrams (k) and (l). The gated clock signals CGCS' and CGCS" are generated by ANDing a latch pause signal LPS [diagram (j)] with the clock signals $2\overline{F_{sc}}$ and 2 $F_{sc}$, respectively. The timing diagrams (m) and (n) respectively show the outputs of the latches 1314 and 1316.

The mux 1318, responsive to the mux control signal MCS [diagram (p)], combines the outputs of the two latches 1314 and 1316 in the manner shown in the timing diagram (q) The actual output of the mux 1318, depicted in the timing diagram (r), occurs synchronously with the 4 $F_{sc}$ system clock signal CK. In the mux output, the pair of chroma pixels $S_2$ and $S_3$ (i.e , the chroma equivalent sample $C_1$) are repeated to horizontally stretch the chroma signal C'.

The output of the mux 1318 is applied to the chroma pixel inverter 1320. The chroma pixel inverter 1320, responsive to the chroma pixel invert signal CPINV [timing diagram (s)], inverts the polarity of the chroma pixels in the manner shown in the timing diagram (t) to restore the phase coherence in the output signal C".

FIG. 15 is a block diagram of circuitry employed for generating various control signals CHPLS, CHCPS, CGCS, CGCS', CGCS", MCS and CPINV used in the FIG. 13 circuitry. To this end, an 8-bit incremental value N (which varies between 128 and 255) is applied to a pair of cascade-connected latches 1502 and 1504. The latch 1502 is clocked by the vertical sync signal VS. The latch 1504 is reset by a reset signal RST1 and clocked by the 2 $F_{sc}$ clock signal. the latch 1504

The 8-bit incremental value N from the latch 1504 is applied to one input port of an adder 1506. The output port of the adder 1506 is coupled to the input port of an 8-bit register 1508. The 8-bit register 1508 is cleared by the first reset signal RST1 and clocked by the 2 $F_{sc}$ clock signal. The output port of the register 1508 is coupled to a second input port of the adder 1506. The register 1508 and the adder 1506 form a modulo 256 accumulator 1510. The most significant bit (MSB) of the value provided by the register 1508 is applied to a first input terminal of a NAND gate 1512 and an inverter 1514. The inverter output is delayed by one period of the 2 $F_{sc}$ clock signal via a flip-flop 1516. The delayed and inverted MSB is applied to the second input terminal of the NAND gate 1512. The output of the NAND gate 1512 delayed by about two periods of the 4 $F_{sc}$ clock signal (via a flip-flop 1518) is the chroma horizontal count pause signal CHCPS.

The chroma horizontal count pause signal CHCPS is ANDed with the 4 $F_{sc}$ clock signal CK in an AND gate 1520 to generate the chroma gated clock signal CGCS The signal CGCS clocks the chroma pixel read address counter 1334.

The chroma horizontal count pause signal CHCPS is delayed by one period of the $\overline{4\ F_{sc}}$ clock signal via a flip-flop 1522 to generate the latch pause pulse LPS. The signal LPS is used for selectively inhibiting the latches 1314 and 1316.

Circuitry 1550, responsive to the horizontal sync signal HS, develops the control signals RST1 and CHPLS (i.e., chroma horizontal position load signal) referred to above. Additionally, the circuitry 1550 develops a second reset signal RST2. The second reset signal RST2 clears a pair of flip-flops 1572 and 1592. The flip-flop 1572 generates the mux control signal MCS and the first and second gated clock signals CGCS' and CGCS''. The flip-flop 1592 provides the chroma pixel invert signal CPINV.

The horizontal sync signal HS is applied to a flip-flop 1552 clocked by the 4 $F_{sc}$ clock signal CK. Refer to FIG. 16 for the timing diagrams The output A of the flip-flop 1552 is inverted by an inverter 1554. The inverted output $\overline{A}$ is applied to a flip-flop 1556, also clocked by the 4 $F_{sc}$ clock signal CK. The outputs A and B of the two flip-flops 1552 and 1556 are applied to a NAND gate 1558. The output C of the NAND gate 1558 is une second reset signal RST2. The NAND gate 1558 produces a negative going pulse having a duration of one period of the 4 1 $F_{sc}$ clock signal CK in response to the rising edge of the horizontal sync signal HS.

The output B of the flip-flops 1556 is delayed by about one period of the 2 $F_{sc}$ clock signal via a flip-flop 1560. The delayed output D of the flip-flop 1560 is inverted by an inverter 1562. The inverted output $\overline{D}$ is applied to a T-FF 1564, clocked by the 4 $F_{sc}$ clock signal CK. The output E of the flip-flop 1564 is the first reset signal RST1.

The timing diagrams (m) through (v) in FIG. 16 depict the respective signals A', B'. . . etc. generated in response to a falling edge of the horizontal sync signal HS. The outputs D' and E' of the two flip-flops 1560 and 1564 are applied to a NAND gate 1566. The NAND gate 1566 generates a negative going pulse F', shown in the timing diagram (u) in FIG. 16, having a width of one period of the 4 $F_{sc}$ clock signal CK in response to a falling edge of the horizontal sync signal HS', depicted in the timing diagram (m) in FIG. 16. The output F' of the NAND gate 1566 is delayed by about one period of the 4 $F_{sc}$ clock signal via a T-FF 1568 to generate the chroma horizontal position load signal CHPLS, shown in the timing diagram (v) in FIG. 16.

To generate the mux control signal MCS and the first and second gated clock signals CGCS' and CGCS'', the $\overline{4\ F_{sc}}$ clock signal is applied to the clock input terminal of the flip-flop 1572. The flip-flop 1572 is cleared by the second reset signal RST2. The Q output of the flip-flop 1572 is applied to the data inuut terminal of a 1574 clocked by the $\overline{4\ F_{sc}}$ clock signal. The output of the flip-flop 1574 is the mux control signal MCS.

The Q and $\overline{Q}$ outputs of the flip-flops 1572 are applied to the first input terminals of a pair of AND gates 1576 and 1578. The second input terminals of the AND gates 1576 and 1578 are coupled to receive the 4 $F_{sc}$ clock signal CK. The outputs of the two AND gates are respectively the two clock signals $\overline{2\ F_{sc}}$ and 2 $F_{sc}$. The 2 $F_{sc}$ and $\overline{2\ F_{sc}}$ clock signals are ANDed with the latch pause signal LPS via the AND gates 1580 and 1582 to generate the respective gated clock signals CGCS'' and CGCS'.

To develop the chroma pixel invert signal CPINV, the flip-flop 1592 is cleared by the second reset signal RST2 and clocked by the chroma horizontal count pause signal CHCPS The Q output of the flip-flop 1592, delayed by one period of the 2 $F_{sc}$ clock signal in a delay element 1594, is the chroma pixel invert signal CPINV.

The vertically and horizontally expanded luma and chroma signals Y'' and C'' are coupled to a conventional luma/chroma processing circuit 52 as shown in FIG. 1. The R, G and B outputs from the luma/chroma processing circuits 52 are applied to a kinescope 54 for producing a magnified picture.

What is claimed is:

1. Circuitry for developing a magnified video image which is increased in size along a linear dimension by a magnification factor relative to an unmagnified video image comprising:

a source of an incoming composite video signal consisting of luma and chroma signal components and horizontal and vertical sync signals; said chroma signal being in the form of a modulated color subcarrier signal, said color subcarrier having an unmodulated frequency, fc;

a source of a system clock signal having a nominal frequency that is a fixed multiple of said unmodulated frequency of said color subcarrier signal;

conversion means coupled to receive said composite video signal and responsive to said system clock signal for generating digital samples representative of said composite video signal;

memory means, coupled to said conversion means, for storing said digital samples in response to a write address signal, and for providing said samples at an output port thereof in response to a read address signal;

means responsive to said system clock signal and said horizontal and vertical sync signals for generating said write address signal; said write address signal having a line address component which is reset in response to said vertical sync signal and which is incremented in response to said horizontal sync signal; said write address signal further having a pixel address component which is reset in response to said horizontal sync signal HS and which is incremented in response to said system clock signal;

means responsive to said system clock signal and said horizontal and vertical sync signals for generating said read address signal; said read address signal having a line address component which is reset in response to said vertical sync signal and which is incremented in response to said horizontal sync signal, said read address signal further having a pixel address component which is reset in response to said horizontal sync signal and which is incremanted in response to said system clock signal;

means responsive to said magnification factor for generating an inhibit signal; said inhibit signal selectively inhibiting said read address signal generating means from incrementing at least one of said line and pixel address components of said read address signal, thereby causing selected lines or pixels of said video signal to repeat in the output of said memory means;

separating means coupled to said memory means and responsive to said inhibit signal for producing samples representing chroma signal to the exclusion of said luma signal component of said composite video signal; and means coupled to said separating means and responsive to said inhibit signal for selectively inverting the polarity of said separated chroma signal to restore its phase coherence.

2. The circuitry defined in claim 1 wherein said composite video signal is in the form of an interlaced video signal alternately defining an odd field and an even field.

3. The circuitry defined in claim 2 wherein said memory means has capacity to store at least one field of said composite video signal.

4. The circuitry defined in claim 1 wherein said line and pixel address components of said read address signal are reset to the respective initial line and pixel addresses in response to said vertical and horizontal sync signals; wherein said initial line and pixel addresses of said read address signal define the position of the portion of the original image to be magnified.

5. The circuitry defined in claim 1 wherein said inhibit signal generating means is additionally responsive to said horizontal sync signal; wherein said inhibit signal selectively inhibits said read address signal generating means from incrementing said line address component of said read address signal, thereby causing selected lines of said video signal to repeat in the output of said memory means 6. The circuitry defined in claim 5 wherein said inhibit signal generating means comprises:

a source of a digital value N where N is a positive number representative of said magnification factor;

modulo M digital values accumulating means coupled to said source of digital value N and responsive to said horizontal sync signal for adding said digital value N to a stored digital value, and for storing the resultant sum (modulo M) as said stored digital value; and means coupled to said modulo M digital value accumulating means and responsive to the value of the sum developed thereby and to said horizontal sync signal for providing said inhibit signal;

wherein said magnified image is increased in size along the vertical dimension by a factor of M/N relative to said unmagnified image.

7. The circuitry defined in claim 6 wherein said read address signal generating means includes means for generating said line address component of said read address signal, and additional means for generating said pixel address component thereof; wherein said means for generating said line address component of said read address signal comprises:

a counter which is loaded with an initial line starting address in response to said vertical sync signal, and which is clocked by a gated timing signal; and means coupled to receive said horizontal sync signal and said inhibit signal for generating said gated timing signal.

8. The circuitry defined in claim 7 wherein said polarity inverting means includes means responsive to the least significant bit (LSB) of said line address component of said read address signal.

9. The circuitry defined in claim 8 further including means for increasing the horizontal dimension of said unmagnified image by a second magnification factor comprising:

line memory means for storing said digital chroma samples coupled to its input port in response to a pixel write address signal, and for providing said samples at its output port in response to a pixel read address signal;

means responsive to said system clock signal and said horizontal sync signal for generating said pixel write address signal; said pixel write address signal being reset in response to said horizontal sync signal and incremented in response to said system clock signal;

means responsive to said system clock signal and said horizontal sync signal for generating said pixel read address signal; said pixel read address signal being reset in response to said horizontal sync signal and incremented in response to said system clock signal;

means responsive to said second magnification factor and said system clock signal for generating a second inhibit signal; said second inhibit signal selectively inhibiting said pixel read address signal generating means from incrementing said pixel read address signal, thereby causing selected samples of said chroma signal to repeat in the output of said line memory means; and means coupled to said line memory means and responsive to said second inhibit signal for selectively inverting the polarity of said chroma samples in a manner restoring their phase coherence with said color subcarrier signal.

10. The circuitry defined in claim 9 wherein said second inhibit signal generating means comprises:

a source of a digital value N' where N' is a positive number representative of said second magnification factor;

modulo M' digital values accumulating means coupled to said source of digital value N' and responsive to said system clock signal for adding said digital value N' to a stored digital value, and for storing the resultant sum (modulo M') as said stored digital value; and means coupled to said modulo M' digital value accumulating means and responsive to the value of the sum developed thereby and to said system clock signal for providing said second inhibit signal;

wherein said magnified image is increased in size along the horizontal dimension by a factor of M'/N' relative to said unmagnified image.

11. The circuitry defined in claim 10 wherein said pixel read address signal generating means comprises a counter which is loaded with an initial pixel starting address in response to said horizontal sync signal and which is clocked by a gated clocking signal; and means coupled to receive said system clock signal and said second inhibit signal for generating said gated clocking signal.

12. The circuitry defined in claim 11 wherein said line memory means comprises a pair of line memories which are alternately read out and written in response to said horizontal sync signal.

13. The circuitry defined in claim 12 wherein said second-mentioned polarity inverting means includes means responsive to the least significant bit (LSB) of said pixel read address signal 14. Circuitry for developing a magnified image which is increased in size along a horizontal dimension by a magnification factor relative to an unmagnified image comprising:

a source of a composite video signal consisting of luma, chroma and sync signal components; said chroma signal being in the form of a modulated color subcarrier signal;

a source of a system clock signal having a nominal frequency that is a fixed multiple of the unmodulated frequency of said color subcarrier signal;

means coupled to receive said composite video signal and responsive to said system clock signal for developing digital samples representative of said chroma signal at instants determined by said system clock signal;

memory means for storing said chroma samples coupled to its input port in response to a pixel write address signal, and for providing said samples at its output port in response to a pixel read address signal;

means responsive to said system clock signal and said sync signal for generating said pixel write address signal; said pixel write address signal being reset in response to said sync signal and incremented in response to said system clock signal;

means responsive to said system clock signal and said sync signal for generating said pixel read address signal; said pixel read address signal being reset in response to said sync signal and incremented in response to said system clock signal;

means responsive to said magnification factor and said system clock signal for generating an inhibit signal; said inhibit signal selectively inhibiting said pixel read address signal generating means from incrementing said pixel read address signal, thereby causing selected samples of said chroma signal to repeat in the output of said memory means; and means coupled to said memory means and responsive to said inhibit signal for selectively inverting the polarity of said chroma samples in a manner restoring their phase coherence with said color subcarrier signal.

15. Apparatus for altering the size of the objects in a television picture without changing the size of the raster comprising:

first means, responsive to a incoming television video signal which includes luminance and chrominance signal components, for sampling the same and for providing a predetermined number of samples of the chrominance signal component per line and a predetermined number of lines per field at an output terminal thereof;

second means, coupled to said first means, for altering the number of chrominance samples per line provided at said output terminal to thereby change the width of said television picture; said second means including means for conditioning said first means to repeat samples provided at said output terminal in groups of K/R, where K is the number of samples in a color subcarrier cycle and where R is an integer multiple (including one) of two; and third means, coupled to said output terminal, for selectively inverting the polarity of ones of said chrominance samples.

16. Apparatus defined in claim 15 further including means for repeating lines of said chrominance samples and for selectively inverting the polarity of ones of said lines of chrominance samples.

* * * * *